United States Patent
Braho et al.

(10) Patent No.: US 9,299,344 B2
(45) Date of Patent: *Mar. 29, 2016

(54) APPARATUS AND METHOD TO CLASSIFY SOUND TO DETECT SPEECH

(71) Applicant: Intermec IP Corp., Fort Mill, SC (US)

(72) Inventors: Keith P. Braho, Murrysville, PA (US); David D. Hardek, Allison Park, PA (US)

(73) Assignee: Intermec IP Corp., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/789,267

(22) Filed: Jul. 1, 2015

(65) Prior Publication Data

US 2015/0302853 A1    Oct. 22, 2015

Related U.S. Application Data

(63) Continuation of application No. 13/797,250, filed on Mar. 12, 2013, now Pat. No. 9,076,459.

(51) Int. Cl.
*G10L 15/20* (2006.01)
*G10L 25/78* (2013.01)

(52) U.S. Cl.
CPC .................. *G10L 15/20* (2013.01); *G10L 25/78* (2013.01)

(58) Field of Classification Search
CPC ......... G10L 25/48; G10L 25/78; G10L 25/36; G10L 15/20; G11B 27/28; G06F 17/30817
USPC ........................................................ 704/233
See application file for complete search history.

(56) References Cited

U.S. PATENT DOCUMENTS

| | | |
|---|---|---|
| 5,727,072 A | 3/1998 | Raman |
| 6,910,911 B2 | 6/2005 | Mellott et al. |
| 7,052,799 B2 | 5/2006 | Zatelzalo et al. |
| 7,146,315 B2 | 12/2006 | Balan et al. |
| 7,228,275 B1 | 6/2007 | Endo et al. |
| 7,316,354 B2 | 1/2008 | Davis |
| 7,391,863 B2 | 6/2008 | Viduya et al. |
| 7,442,060 B2 | 10/2008 | Suwalski et al. |

(Continued)

FOREIGN PATENT DOCUMENTS

EP    2779160 A    9/2014

OTHER PUBLICATIONS

EP Exam Report dated Apr. 21, 2015, related matter EP Application No. 14157730.4-1910, 5 pages.

(Continued)

*Primary Examiner* — Charlotte M Baker
(74) *Attorney, Agent, or Firm* — Addition, Higgins & Pendleton, P.A.

(57) ABSTRACT

Audio frames are classified as either speech, non-transient background noise, or transient noise events. Probabilities of speech or transient noise event, or other metrics may be calculated to indicate confidence in classification. Frames classified as speech or noise events are not used in updating models (e.g., spectral subtraction noise estimates, silence model, background energy estimates, signal-to-noise ratio) of non-transient background noise. Frame classification affects acceptance/rejection of recognition hypothesis. Classifications and other audio related information may be determined by circuitry in a headset, and sent (e.g., wirelessly) to a separate processor-based recognition device.

20 Claims, 9 Drawing Sheets

(56) References Cited

U.S. PATENT DOCUMENTS

| | | |
|---|---|---|
| 7,496,387 B2 | 2/2009 | Byford et al. |
| 7,609,669 B2 | 10/2009 | Sweeney et al. |
| 7,664,657 B1 | 2/2010 | Letzt et al. |
| 7,734,361 B2 | 6/2010 | Murawski et al. |
| 7,773,767 B2 | 8/2010 | Wahl et al. |
| 7,827,032 B2 | 11/2010 | Braho et al. |
| 7,865,362 B2 | 1/2011 | Braho et al. |
| 7,885,419 B2 | 2/2011 | Wahl et al. |
| 7,895,039 B2 | 2/2011 | Braho et al. |
| 7,996,002 B2 | 8/2011 | Sweeney et al. |
| 8,027,833 B2 | 9/2011 | Heterington et al. |
| 8,128,422 B2 | 3/2012 | Mellott et al. |
| 8,160,287 B2 | 4/2012 | Slippy et al. |
| 8,200,495 B2 | 6/2012 | Braho et al. |
| 8,233,924 B2 | 7/2012 | Sweeney et al. |
| 8,284,926 B2 | 10/2012 | Diethorn |
| 8,417,185 B2 | 4/2013 | Braho et al. |
| 8,451,101 B2 | 5/2013 | Somasundaram et al. |
| 8,467,543 B2 | 6/2013 | Burnett et al. |
| 8,521,538 B2 | 8/2013 | Laughery et al. |
| 8,554,564 B2 | 10/2013 | Heterington et al. |
| 8,660,291 B2 | 2/2014 | Bouchard et al. |
| 9,076,459 B2 | 7/2015 | Braho et al. |
| 2003/0179888 A1 | 9/2003 | Burnett et al. |
| 2003/0228023 A1 | 12/2003 | Burntett et al. |
| 2004/0001997 A1 | 1/2004 | Zatezalo et al. |
| 2004/0002243 A1 | 1/2004 | Mellott et al. |
| 2004/0003136 A1 | 1/2004 | Murawski et al. |
| 2004/0059579 A1 | 3/2004 | Murawski et al. |
| 2005/0010418 A1 | 1/2005 | McNair et al. |
| 2005/0010892 A1 | 1/2005 | McNair et al. |
| 2005/0070337 A1 | 3/2005 | Byford et al. |
| 2005/0071158 A1 | 3/2005 | Byford et al. |
| 2005/0095899 A1 | 5/2005 | Mellott et al. |
| 2005/0200632 A1 | 9/2005 | Davis |
| 2005/0242180 A1 | 11/2005 | Byford |
| 2005/0272401 A1 | 12/2005 | Zatezalo et al. |
| 2005/0286717 A1 | 12/2005 | Viduya et al. |
| 2006/0003785 A1 | 1/2006 | Zatezalo |
| 2006/0178882 A1 | 8/2006 | Braho et al. |
| 2006/0178886 A1 | 8/2006 | Braho et al. |
| 2006/0182085 A1 | 8/2006 | Sweeney et al. |
| 2006/0251268 A1 | 11/2006 | Heterington et al. |
| 2007/0016460 A1 | 1/2007 | Weiss |
| 2007/0143105 A1 | 6/2007 | Braho et al. |
| 2008/0031441 A1 | 2/2008 | Braho et al. |
| 2008/0032533 A1 | 2/2008 | Suwalski |
| 2008/0300016 A1 | 12/2008 | Nickel |
| 2009/0257484 A1 | 10/2009 | Liu |
| 2010/0052871 A1 | 3/2010 | Somasundaram et al. |
| 2011/0029312 A1 | 2/2011 | Braho et al. |
| 2011/0029313 A1 | 2/2011 | Braho et al. |
| 2011/0040564 A1 | 2/2011 | Laughery et al. |
| 2011/0056723 A1 | 3/2011 | Slippy et al. |
| 2011/0287751 A1 | 11/2011 | Sweeney et al. |
| 2011/0305345 A1 | 12/2011 | Bouchard et al. |
| 2012/0066600 A1 | 3/2012 | Nickel |
| 2012/0078397 A1 | 3/2012 | Lee et al. |
| 2012/0265530 A1 | 10/2012 | Hetherington et al. |
| 2013/0054236 A1 | 2/2013 | Garcia et al. |
| 2014/0172424 A1 | 6/2014 | Grokop et al. |

OTHER PUBLICATIONS

European Search Report in EP Application No. 14157730.4, Dated Jun. 25, 2014, 5 pages.

European Office Action in EP Application No. 14157730.4, Dated Aug. 19, 2014, 6 pages.

APPARATUS AND METHOD TO CLASSIFY SOUND TO DETECT SPEECH

CROSS-REFERENCE TO RELATED APPLICATION

The present application claims the benefit of U.S. patent application Ser. No. 13/797,250 for an Apparatus and Method to Classify Sound to Detect Speech filed Mar. 12, 2013 (and published Sep. 18, 2014 as U.S. Patent Application Publication No. 2014/0278391), now U.S. Pat. No. 9,076,459. Each of the foregoing patent application, patent publication, and patent is hereby incorporated by reference in its entirety.

TECHNICAL FIELD

This application relates generally to voice-driven systems, and more specifically to analysis of sounds in detecting and/or recognizing speech for use with or in voice-driven systems.

BACKGROUND

Voice-driven systems typically include at least one microphone and at least one processor-based device (e.g., computer system) which is operated in response to human voice or spoken input, for instance spoken commands and/or information.

There are numerous applications in which voice-driven systems may be employed. For instance, there are many applications where it is advantageous for a user to have their hands free to perform tasks other than operating a keyboard, keypad, mouse, trackball, joystick or other user input device. An example of one such application is a warehouse, where a user may need to handle items such as boxes while concurrently interacting with a processor-based device. An example of another such application is a courier or delivery person, who may be handling parcels or driving a vehicle while concurrently interacting with a processor-based device. An example of a further such application is a medical care provider, who may be using their hands during the performance of therapeutic or diagnostic medical services, while concurrently interacting with a processor-based device. There are of course numerous other examples of applications.

In many of these exemplary applications, as well as other applications, it is also advantageous or even necessary for the user to be mobile. For applications in which mobility is desirable, the user may wear a headset and a portable processor-based device. The headset typically includes at least one speaker and/or microphone. The portable processor-based device typically takes the form of a wearable computer system. The headset is communicatively coupled to the portable processor-based device, for instance via a coiled wire.

In some applications, the portable processor-based device may in turn be communicatively coupled to a host or backend computer system (e.g., server computer). In many applications, two or more portable processor-based devices may be communicatively coupled to the host or backend computer system, which may function as a centralized computer system or server providing the computing and data-processing functions to various users via respective portable processor-based devices and headsets. Such may, for example, be advantageously employed in an inventory management system in which a central or server computer system performs tracking and management, a plurality of users each wearing respective portable computer systems and headsets interface with the central or server computer system. This approach allows the user(s) to provide spoken or voice input to the voice driven system, including commands and/or information. This approach also allows the user(s) to receive audible instructions and/or information from the voice driven system. For instance, the user may receive voice instructions, ask questions, provide reports on progress of their assigned tasks, report working conditions, such as inventory shortages, damaged goods or parcels, and/or receive directions such as location information specifying locations for picking up or delivering goods.

Voice driven systems are often utilized in noisy environments where various extraneous sounds interfere with voice or spoken input. For example, in a warehouse or logistics center environment, extraneous sounds are often prevalent, including, for instance the movement of boxes or pallets, noise from the operation of lift vehicles (e.g., forklifts), public address announcements, and/or conversations which are not intended as input. To be effective, voice driven systems need to distinguish been voice or speech as intended input and extraneous sounds which may otherwise be interpreted as actual speech from a headset-wearing user. Sounds or noise associated with public address systems are particularly difficult to address. Public address systems are intentionally loud, so that announcements can be heard above other extraneous noise in the ambient environment. Therefore, it is very likely that a headset microphone will pick up such sounds. Additionally, public address system announcements are not unintelligible noise, but rather are typically human voice or spoken, thereby having many of the same aural qualities as voice or spoken input.

There is a particular need for addressing extraneous sounds such as noise in an environment using voice driven systems to prevent those extraneous sounds from interfering with the desired operation of the voice driven systems. The approaches described herein may adequately address these extraneous sounds.

SUMMARY

Sound classification components are employed in a system and method that classifies sound as likely being speech, non-transient background noise, or transient background noise events. Speech recognition components employ the classification in recognizing speech, for use in or with speech driven systems, for instance backend or server computers. By separately identifying transient noise events, the system is able to advantageously eliminate what might be described as false positives. That is the system may be able to eliminate sounds that are very similar to speech (e.g., public address announcements), but which are considered noise with respect to the target or desired speech which is that spoken by the user.

The sound classification components may be part of a headset, worn by a user, which includes one or preferably more microphones. The speech recognition components may be part of a processor-based speech recognition device, which may be separate from the headset. The processor-based speech recognition device may or may not also be worn by the user. Preferably, the headset is wirelessly communicatively coupled with the processor-based speech recognition device. Alternatively, the headset is communicatively coupled with the processor-based speech recognition device via one or more wires. Circuitry in the headset may selectively provide classification, confidence values, digitized audio, and/or other audio related information and/or metadata to the processor-based speech recognition device. Circuitry in the headset may selectively provide such audio related information and/or metadata based at least in part on an assessment of whether the audio related information and/or metadata relates to speech or noise.

The processor-based speech recognition device may employ audio related information and/or metadata, particularly the classifications and/or confidence values in recognizing sound as speech. For example the processor-based speech recognition device may employ the classifications and/or confidence values in noise suppression, detecting speech and/or adjusting thresholds.

The approaches described herein may, for example, address the problem of background noises, particularly transient noise events, such as horn beeps, that may be erroneously recognized as speech due to their close temporal proximity to user speech. Thus, human speech may cause a speech detector to be turned ON, which adds some padding (i.e., fragments of audio occurring temporally immediately before or following a set of fragments) around the suspected user speech. The padded segment of audio is passed to a decoder to be compared against word models or templates. Under conventional approaches, horn beeps and other background noises (e.g., parcel drops) within the padded segments or audio would sometimes be erroneously recognized or inserted. The approach described herein discriminates between non-transient background noise and transient noise events, and uses this classification to adjust a threshold or confidence value or score, reducing the probability of error. Thus, the adjustment in threshold or score or confidence value of a hypothesized word may cause a recognition of a word or other phrase tainted by noise to be rejected.

The classification is employed to adjust a confidence value or score of words or other phrases produced by a speech recognition system to prevent background sounds from erroneously being recognized as speech. Alternatively, classification is employed to adjust a rejection threshold (i.e., threshold to which a word's confidence score is compared) of words or other phrases produced by a speech recognition system to prevent background sounds from erroneously being recognized as speech.

A method of operation in a speech recognition system may be summarized as including analyzing each of a plurality of frames of audio by a sound classifier; classifying a first number of the frames of audio as speech by the sound classifier; classifying a second number of the frames of audio as non-transient background noise by the sound classifier; classifying a third number of the frames of audio as transient noise events by the sound classifier; and providing signals indicative at least of the classifications of the frames of audio to a speech recognizer.

The sound classifier may be part of a headset with at least two microphones, the speech recognizer may be implemented by a processor-based device separate from the headset, and providing the signals indicative at least of the classifications of the frames of audio to a speech recognizer may include wirelessly providing the signals to the processor-based device that implements the speech recognizer. Providing the signals indicative at least of the classifications of the frames of audio to a speech recognizer may include wirelessly providing the signals with at least a logical relationship to respective data that represents audio of at least some of the frames of audio. The respective data that represents audio of at least some of the frames of audio may include at least one of autocorrelation coefficients or digitized audio fragments. Classifying a second number of the frames of audio as non-transient background noise by the sound classifier may include, for each frame of audio determining a metric for the respective frame, comparing the determined metric for the respective frame to an average metric for a plurality of frames of audio, classifying the respective frame as a transient noise if the determined metric for the respective frame exceeds the average metric for the plurality of frames of audio by at least a first threshold, and otherwise classifying the respective frame as a non-transient background noise.

The method of operation in a speech recognition system may further include employing the classifications in detecting at least one of a start or a stop of speech by a speech detector of the speech recognizer based at least in part on the received classifications of each of a number of the frames of audio.

Employing the classifications in detecting at least one of a start or a stop of speech by the speech detector of the speech recognizer based at least in part on the received classifications of each of a number of the frames of audio may include, for each of a set of two or more fragments, determining how many of the fragments in the set are classified as a first one of the classifications, and treating the entire set as either speech or non-speech based on the how many of the fragments in the set are classified as the first one of the classifications. Determining how many of the fragments in the set are classified as a first one of the classifications may include determining how many of the fragments in the set are classified as speech. Employing the classifications in detecting at least one of a start or a stop in speech by a speech detector of the speech recognizer based at least in part on the received classifications of each of a number of the frames of audio may further include a) identifying a set of fragments in which the number of fragments individually classified as speech exceeds a threshold as constituting speech.

The method of operation in a speech recognition system may further include for sets of fragments identified as speech at least one of prepending or postpending additional fragments of audio to the respective set for processing, where the additional fragments of audio occurred immediately before or immediately after the audio fragments of the respective set of fragments.

The method of operation in a speech recognition system may further include generating features based at least in part on the received classifications of the frames of audio.

Generating features based at least in part on the received classifications of the frames of audio may include generating features based on fragments classified as speech and not on fragments classified as either non-transient background noise or transient noise events.

The method of operation in a speech recognition system may further include updating a background noise estimate based on non-transient background noise and not based on transient noise events.

The method of operation in a speech recognition system may further include determining confidence values based at least in part on distinguishing between non-transient background noise and transient noise events.

The method of operation in a speech recognition system may further include adjusting a threshold at which audio is either rejected or accepted as speech based at least in part on distinguishing between non-transient background noise and transient noise events. The method of operation may further include adjusting the confidence value of a hypothesis or portion thereof based at least in part on distinguishing among speech events, non-transient background noise and transient noise events.

A speech recognition system may be summarized as including a sound classifier that includes at least one non-transitory processor-readable medium and at least one processor communicatively coupled to the at least one non-transitory processor-readable medium, and that analyzes each of a plurality of frames of audio, classifies a first number of the frames of audio as speech by the sound classifier, classifies a second number of the frames of audio as non-transient background noise by the sound classifier, classifies a third number of the frames of audio as transient noise events by the sound classifier, and provides signals indicative at least of the classifications of the frames of audio.

The speech recognition system may further include a speech recognizer communicatively coupled to receive the signals from the sound classifier and operable to distinguish sets of fragments containing speech from sets of fragments not containing speech based at least in part on the classifications indicated in the signals received from the sound classifier.

The sound classifier may be part of a headset with at least two microphones, the speech recognizer may be implemented by a processor-based device separate from the headset, and the sound classifier may wirelessly provide the signals to the processor-based device that implements the speech recognizer. The sound classifier may wirelessly provide the signals with at least a logical relationship to respective data that represents audio of at least some of the frames of audio. The respective data that represents audio of at least some of the frames of audio may include at least one of autocorrelation coefficients or digitized audio fragments. For each frame of audio, the sound classifier may determine a metric for the respective frame, compare the determined metric for the respective frame to an average metric for a plurality of frames of audio, classify the respective frame as a transient noise if the determined metric for the respective frame exceeds the average metric for the plurality of frames of audio by at least a first threshold, and otherwise classify the respective frame as non-transient background noise. A speech detector of the speech recognizer may employ the classifications to detect at least one of a start or a stop of speech by based at least in part on the received classifications of each of number of the frames of audio. For each of a set of two or more fragments, the speech detector may determine how many of the fragments in the set are classified as a first one of the classifications, and treat the entire set as either speech or non-speech based on the how many of the fragments in the set are classified as the first one of the classifications in order to employ the classifications in the detection at least one of the start or the stop of speech. The speech detector may determine how many of the fragments in the set are classified as speech. The speech detector may a) identify a first set of fragments in which the number of fragments individually classified as speech exceeds a first threshold as constituting speech and b) identify a second set of fragments in which the number of fragments individually classified as speech is below a second threshold as not constituting speech. For sets of fragments identified as speech, at least one component of the voice recognition system may at least one of prepend or postpend additional fragments of audio to the respective set for processing, which fragments of audio occurred immediately before or immediately after the audio fragments of the respective set of fragments. At least one component of the voice recognition system may generate features based at least in part on the received classifications of the frames of audio. The at least one component of the voice recognition system may generate features based on fragments classified as speech and not on fragments classified as either non-transient background noise or transient noise events. At least one component of the voice recognition system may update a background noise estimate based on non-transient background noise and not based on transient noise events. At least one component of the voice recognition system may determine confidence values based at least in part on distinguishing between non-transient background noise and transient noise events. The threshold adjust module may adjust a threshold at which audio is either rejected or accepted as speech based at least in part on distinguishing between non-transient background noise and transient noise events. The threshold adjust module may adjust a confidence value of a hypothesis or portion thereof based at least in part on distinguishing among speech events, non-transient background noise and transient noise events.

A speech recognition system may be summarized as including: a sound classifier that includes at least one non-transitory processor-readable medium and at least one processor communicatively coupled to the at least one non-transitory processor-readable medium, and that analyzes each of a plurality of frames of audio, classifies a first number of the frames of audio as speech by the sound classifier, classifies a second number of the frames of audio as non-speech by the sound classifier, and forms a hypothesis based on the audio; adjusts a threshold at which a recognized hypothesis is either rejected or accepted based at least in part on the first and the second numbers of frames. The sound classifier is communicatively coupled to receive input from at least two microphones.

A speech recognition system may be summarized as including: a sound classifier that includes at least one non-transitory processor-readable medium and at least one processor communicatively coupled to the at least one non-transitory processor-readable medium, and that analyzes a first segment of audio, determines at least two confidences among the following three confidences: a first confidence that the first segment of audio is speech; a second confidence that the first segment of audio is non-transient background noise; or a third confidence that the first segment of audio is transient background noise; generates a hypothesis for a second segment of audio that includes the first segment of audio; and adjusts a threshold at which the hypothesis is either rejected or accepted based at least in part on the at least two confidences. The sound classifier is communicatively coupled to receive input from at least two microphones.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with headsets, processor-based devices such as computers or computer systems, and radios including wireless transmitters, receivers or transceivers, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

As used herein, the terms "audio" or "audio signal" and variations of such, for example "audio signals" are not limited only to an analog audio signal, but rather is used to refer to signals generated by the microphones or other acoustical transducers throughout the signal path and processing. Therefore, "audio" and "audio signal" is used to refer broadly to any signal, analog or digital, associated with the outputs of the microphones or other acoustical transducers and anywhere along the processing continuum.

The headings and Abstract of the Disclosure provided herein are for convenience only and do not interpret the scope or meaning of the embodiments.

Figure 1:
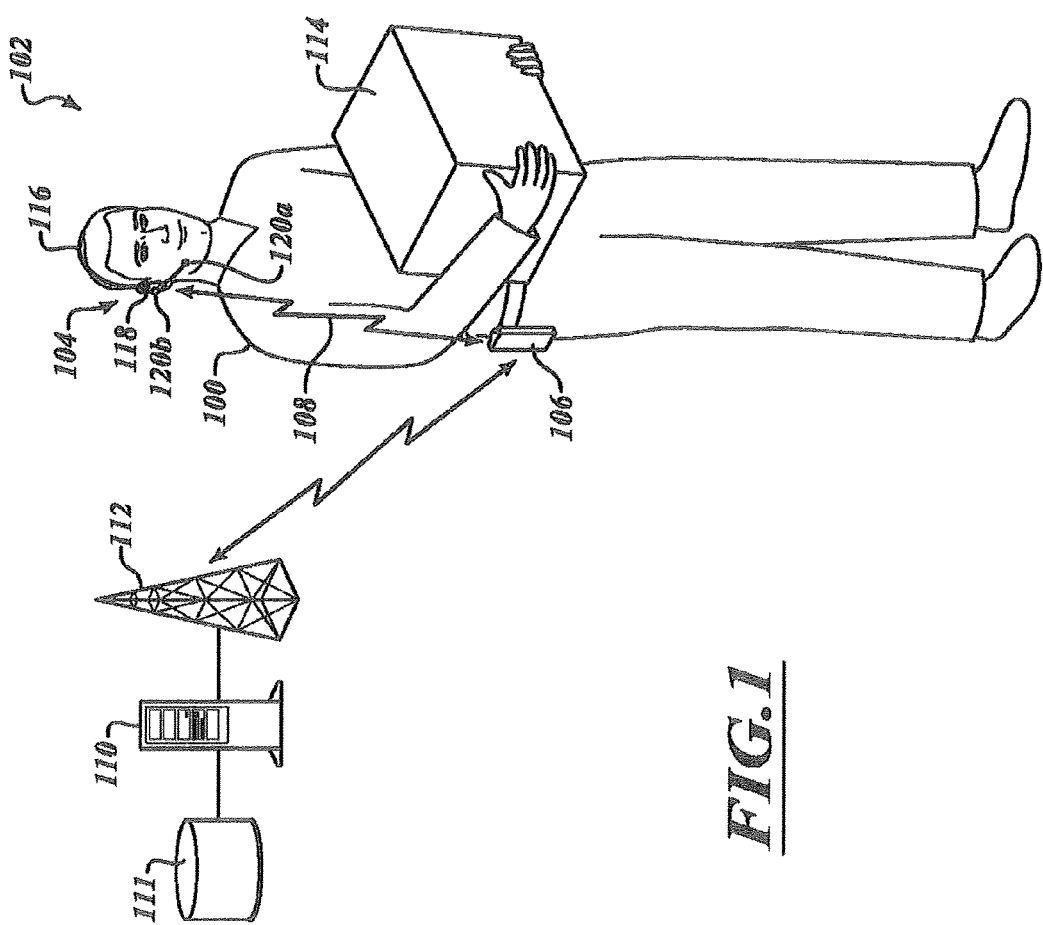
FIG. 1 is an isometric view of user wearing a headset and a processor-based speech recognition device, the user interacting with a backend computer system in a speech driven system, according to one illustrated embodiment.

FIG. 1 shows a user 100 interacting with a speech driven system 102, according to one illustrated embodiment.

In particular, the speech driven system 102 includes a headset 104, a processor-based speech recognition device 106. In use, the user typically wears the headset 104, and optionally wears the processor-based speech recognition device 106. The processor-based speech recognition device 106 is communicatively coupled, either directly or indirectly, with the headset 104. For example, the processor-based speech recognition device 106 and headset 104 may be wirelessly communicatively coupled via one or more radios (e.g., transmitters, receivers, transceivers) as indicated by double-headed arrow 108. Alternatively, the processor-based speech recognition device 106 and headset 104 may be communicatively coupled via one or more cables, for instance one or more wire or optical cables (not shown).

Optionally, the speech driven system 102 may also include one or more backend computer systems 110 (only one shown), which may include or be communicatively coupled to one or more data stores stored on one or more non-transitory computer- or processor-readable media 111. The backend computer system(s) 110 is or are communicatively coupled to one or more processor-based speech recognition devices 106. For example, a wireless networking system may include one or more antennas 112 (only one shown) positioned about a work environment to provide wireless communications between the one or more processor-based speech recognition devices 106 and the one or more backend computer system(s) 110.

The user 100 may engage in various activities which may require the use of the user's hands, for instance to handle goods or packages 114. Alternatively, the activities may not require use of the user's hands; however hand free operation may be more comfortable or otherwise advantageous to the user 100.

The headset 104 may include a headband 116, one or more speakers 118 (only one visible in FIG. 1), one or more microphones 120a, 120b (two visible in FIG. 1, collectively 120), and circuitry. The headband 116 allows the headset 104 to be securely worn by the user 100, and positions the speakers 118 at least proximate one ear or one speaker next to each ear of the user 100. A primary microphone 120a may be positioned proximate and oriented toward a mouth of the user 100 when the headset 104 is worn. One or more secondary microphones 120b may be positioned or oriented relatively away from the mouth of the user 100 with respect to the primary microphone 120a when the headset 104 is worn. As explained below, this allows voice or spoken input by the user 100 to be discerned from background sounds. Background sounds are denoted herein as noise since those background sounds do not constitute desired signal carrying input to or for the voice-driven system 102. As described further below, the circuitry (not shown in FIG. 1) of the headset 104 may incorporate audio processing circuits such as audio filters and correlation circuitry associated with speech detection and/or speech recognition.

The processor-based speech recognition device 106 may be portable or stationary. For example, the processor-based speech recognition device 106 may be worn by the user 100, for instance on a belt as illustrated in FIG. 1. This allows the headset 104 to use relatively short range wireless communications devices, for instance BLUETOOTH® radios, while ensuring that communications between the headset 104 and the processor-based speech recognition devices 106 is maintained during normal use. Alternatively, the processor-based speech recognition device 106 may be manually carried or otherwise transported, for instance on a vehicle (e.g., fork lift, tug). Alternatively or additionally, the processor-based speech recognition device 106 may be stationary. Such implementations may employ a plurality of antennas positioned throughout a work environment and/or sufficiently more powerful communications devices, for instance WIFI® radios. As described further below, the circuitry of the processor-based speech recognition devices 106 may incorporate audio processing circuits for tasks such as filtering, noise suppression and modeling, features vector generation, decoding, and other circuitry associated with speech detection and/or speech recognition.

The headset 104 and processor-based speech recognition device 106 permit various users 100 to communicate with one or more backend computer systems 110 (e.g., server computer systems). In use, the processor-based speech recognition device 106 receives digital instructions from the backend computer system 110 and converts those instructions to audio, which is provided to the user 100 via speakers 118 of the headset 104. The user 100 provides spoken input via microphone(s) 120a of the headset, which the processor-based speech recognition device 106 may convert to a digital format (e.g., text) to be transferred to the backend computer system 110.

The backend computer system(s) 110 may be part of a larger system for sending and receiving information regarding the activities and tasks to be performed by the user(s) 100. The backend computer system(s) 110 may execute one or more system software routines, programs or packages for handling particular tasks. Tasks may, for example, include tasks related to inventory and warehouse management. While less preferred, the backend computer system(s) 110 may implement some, or all, of the functionality of the processor-based speech recognition device 106. The backend computer system 110 may be any targeted computer or automated device, and may be located anywhere with respect to the user and the various components. For instance, the backend computer system 110 will typically be located remotely from the user, such as in another room or facility. However, the background computer system 110 may be located locally with the user, for instance carried or worn by the user or carried by a vehicle operated by the user. In some implementations, that backend computer system 110 may be combined with the processor-based speech recognition device 106.

Figure 2:
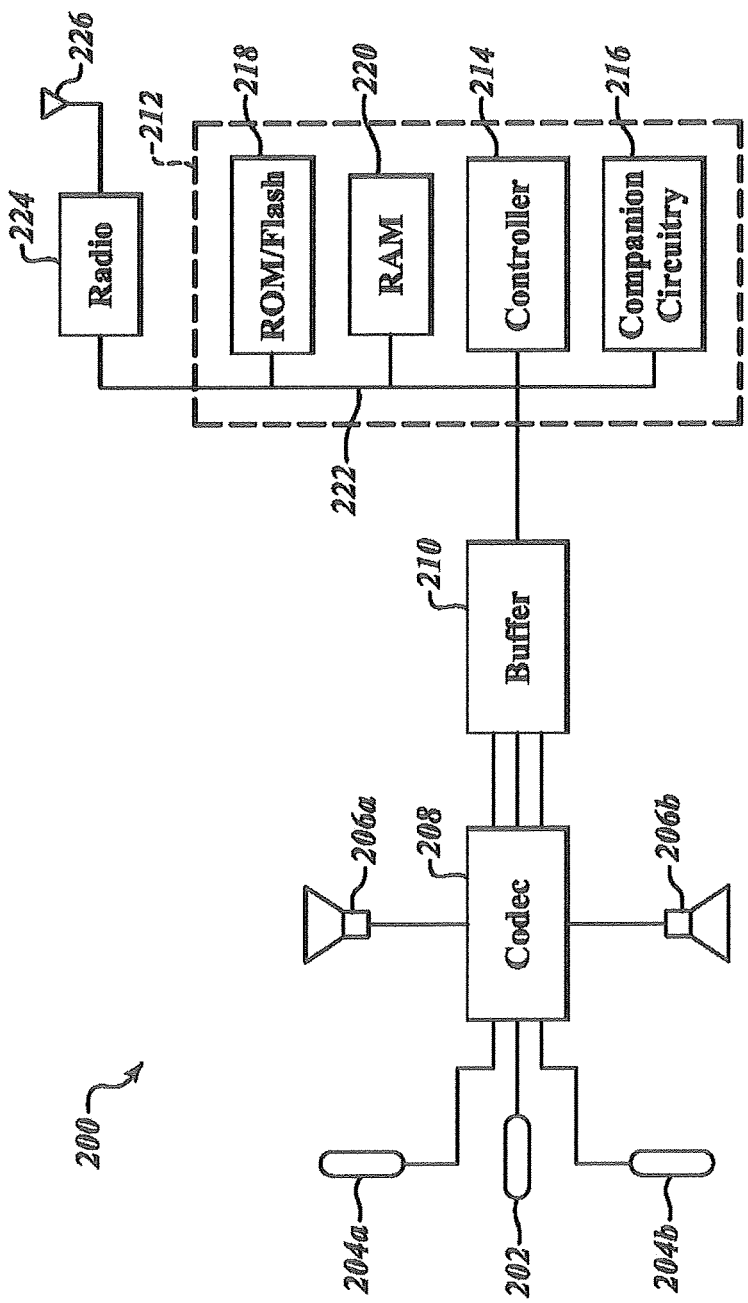
FIG. 2 is a schematic diagram of a headset identical or similar to that of FIG. 1, according to one illustrated embodiment.

FIG. 2 shows some of the components of a headset 200, according to one illustrated embodiment. The headset 200 may be similar or even identical to the headset 104 (FIG. 1).

The headset 200 preferably includes two or more microphones, for instance a primary microphone 202 and a pair of secondary microphones 204a, 204b (collectively 204). Each of the microphones 202, 204 is operable as a transducer to convert acoustic energy (e.g., sounds, such as voice or other sounds) to analog signals (e.g., voltages, currents) that have respective signal levels. The headset 200 preferably includes one or more speakers 206a, 206b (two shown, collectively 206). Each of the speakers 206 is operable as a transducer to convert analog signals (e.g., voltages, currents) that have respective signal levels into acoustic energy (e.g., sounds, such as recorded or artificially generated spoken syllables, words or phrases or utterances).

The primary microphone(s) 202 is (are) positioned or configured (e.g., directional and oriented) to primarily capture speech or utterances by the user 100. In contrast, the secondary microphones 204 are positioned or configured (e.g., omnidirectional and oriented) to primarily capture sounds or noises from sources other than the speech or utterances of the user 100 (FIG. 1), denominated as non-transient background noise or transient noise events.

For example, the primary microphone 202 may be positioned such that when the headset 104 (FIG. 1) is worn by a user 100, the primary microphone 202 is positioned closer to the mouth of the user 100 than is the secondary microphone(s) 204. For example, the primary microphone 202 may be carried at an end of an arm/boom of the headset 104 (FIG. 1), positioning the primary microphone 202 proximate the mouth of the user 100. In contrast, the secondary microphones 204 may be positioned such that when the headset 104 (FIG. 1) is worn by a user 100, the secondary microphone(s) 204 is/are positioned relatively farther from the mouth of the user 100 than is the primary microphone(s) 202. For example, the secondary microphones 204 may be carried on, by or proximate each ear cup or speaker 206 of the headset 200. Consequently, the speech sounds or utterances by the user 100 are louder with respect to the background noise in the primary microphone 202 than the secondary microphone(s) 204 (i.e., the primary microphone 202 has a better signal to noise ratio). In other words, speech or other utterances by the user 100 are predominantly captured by the primary microphone 202.

The primary and secondary microphones 202, 204, respectively, may have similar or even identical acoustical characteristics. Alternatively, the primary and secondary microphones 202, 204, respectively, may have distinctly different acoustical characteristics from one another.

For example, the primary microphone(s) 202 may be directional, and oriented such that an axis of primary sensitivity is aligned towards the mouth of the user 100 (FIG. 1). In contrast, the secondary microphone(s) 204 may, for example, be omnidirectional to pick up sounds or noise from any direction. Alternatively, the secondary microphone(s) 204 may also be directional, however oriented such that an axis of primary sensitivity is not directed towards the mouth of the user 100 (FIG. 1).

Some implementations may employ additional primary microphones 202, for example two or more primary microphones. Some implementations may employ additional secondary microphones 204, for example two, or more secondary microphones. Yet further implementations may omit the secondary microphone(s) 204 altogether, relying on various signal processing techniques to distinguish speech from noise using sound captured only by the primary microphone 202.

The headset 200 may include one or more audio coder/decoders (CODECs). For example, the headset 200 may include an audio CODEC 208 with multiple channels (e.g., stereo channels), coupled to the primary microphone(s) 202 and/or secondary microphone(s) 204 to process analog signals from the microphones 202, 204 and produce digital signals representative of the analog signals. The CODEC 208, or another audio CODEC (not shown) may be coupled to the one or more speakers 206 to produce analog drive signals from digital signals in order to drive the speakers 206. Suitable audio CODECs may for example include the audio CODEC commercially available from Philips under the identifier UDA 1341 and other similar audio CODECs.

The headset 200 may include one or more buffers 210. The buffer(s) 210 may temporarily store or hold signals. The buffer 210 is illustrated as positioned relatively downstream of the CODEC 208 in a signal flow from the microphone(s) 202, 204.

The headset 200 includes a control subsystem 212. The control subsystem 212 may, for example include one or more controllers 214, one or more sets of companion circuitry 216, and one or more non-transitory computer- or processor-readable storage media such a non-volatile memory 218 and volatile memory 220.

The controller(s) 214 may take a variety of forms, for instance one or more microcontrollers, microprocessors, digital signal processors (DSPs), application specific integrated circuits (ASICs), programmable gate arrays (PGAs), graphical processing unit (GPUs) and/or programmable logic controllers (PLCs). The controller(s) 214 may, for example, take the form of a processor commercially available from CSR under the identifier BLUECORE5® Multimedia. The BLUECORE5® Multimedia does not require companion circuitry 216. Alternatively, the controller(s) 214 may take the form of a processor commercially available from Intel under the identifier SA-1110. Optional companion circuitry 216 may take the form of one or more digital, or optionally analog, circuits, which may, or may not, be in the form of one or more integrated circuits. The companion circuitry 216 may, for example, take the form of a companion chip commercially available from Intel under the identifier SA-1111. The controller(s) 214 may function as a main processor, with the companion circuitry functioning as a co-processor to handle specific tasks. In some implementations, the companion circuitry 216 may take the form of one or more DSPs or GPUs.

Non-volatile memory 218 may take a variety of forms, for example one or more read only memories (ROMs), one or more writeable memories, for instance EEPROM and/or one or more FLASH memories. The volatile memory 220 may take a variety of forms, for example one or more random access memories (RAM) including static random access memory (SRAM) and/or dynamic random access memories (DRAM) for instance synchronous DRAM (SDRAM)). The various controllers 214, companion circuits 216, volatile memories 218 and/or nonvolatile memories 220 may be communicatively coupled via one or more buses (only one shown) 222, for instance instructions buses, data buses, address buses, power buses, etc.

The controllers 214 and/or companion circuitry 216 may execute instructions stored in or by the volatile memories 218 and/or nonvolatile memories 220. The controllers 214 and/or companion circuitry 216 may employ data, values, or other information stored in or by the volatile memories 218 and/or nonvolatile memories 220.

The control subsystem 212 may incorporate audio filtering circuitry or implement audio filtering. Audio filtering may, for example, include Mel scale filtering or other filtering. Mel scale filtering provides an indication of the energy distribution of the signals, such as the power spectral density. Measuring or otherwise determining a ratio difference and/or variation between the two signals (and their respective features) generated respectively by the primary microphone(s) 202 and secondary microphone(s) 204, allows the control subsystem to determine when the user is speaking, as well as classifying sound into speech, non-transient or background noise, and transient noise event classes. As described herein, typically the sound signal from the primary microphone 202 will be passed to the processor-based speech recognition device 106 (FIG. 1) for speech recognition when the ratio difference or variation indicates that audio is user speech and not just extraneous non-transient background noise or a transient noise event.

The headset 200 optionally includes one or more radios 224 (only one shown) and associated antennas 226 (only one shown) operable to wirelessly communicative couple the headset 200 to the processor-based speech recognition device 106 and/or backend computer system 110. The radio 224 and antenna 226 may take a variety of forms, for example a wireless transmitter, wireless receiver, or wireless transceiver. The radio 224 and antenna 226 may, for instance, be a radio suitable for short range communications, for example compatible or compliant with the BLUETOOTH protocol, which allows bi-directional communications (e.g., transmit, receive). Alternatively, the radio 224 and antenna 226 may take other forms, such as those compliant with one or more variants of the IEEE 802.11 protocols (e.g., 802.11n protocol, 802.11ac protocol). The radio 224 and antenna 226 may, for example, take the form of an RF communications card, received via a connector, for instance a PCMCIA slot, to couple the RF communications card to the controller 214. RF communications cards are commercially available from a large number of vendors. The range of the radio 224 and antenna 226 should be sufficient to ensure wireless communications in the expected work environment, for instance wireless communications with a processor-based speech recognition device 106 worn by a same user as wears the headset 200.

Figure 3:
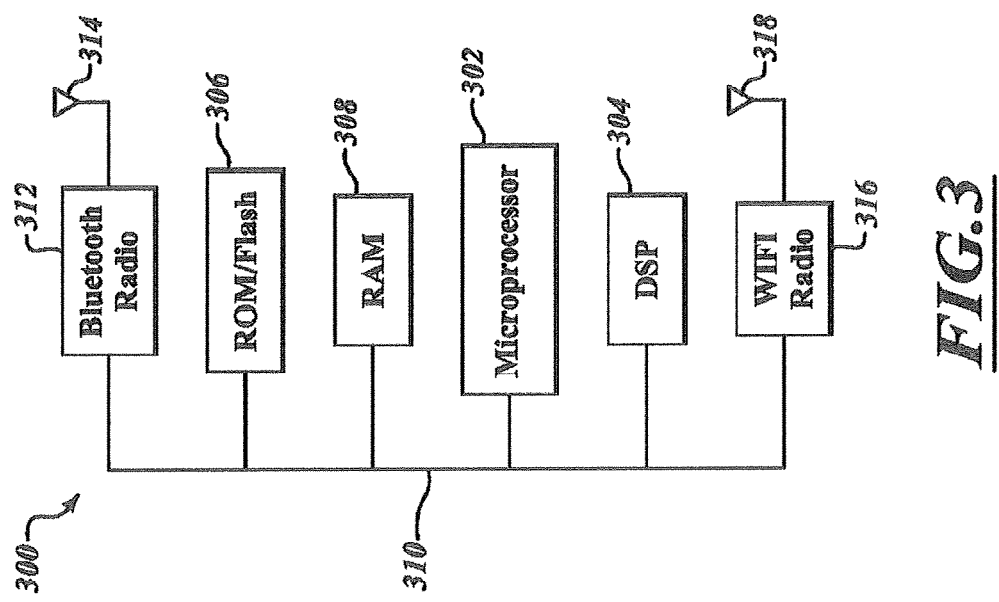
FIG. 3 is a schematic diagram of a processor-based speech recognition device identical or similar to that of FIG. 1, according to one illustrated embodiment.

FIG. 3 shows some of the components of a processor-based speech recognition device 300, according to one illustrated embodiment. The processor-based speech recognition device 300 may be similar or even identical to the processor-based speech recognition device 106 (FIG. 1).

The processor-based speech recognition device 300 may include one or more controllers, for example a microprocessor 302 and DSP 304. While illustrated as a microprocessor 302 and a DSP 304, the controller(s) may take a variety of forms, for instance one or more microcontrollers, ASICs, PGAs, GRUs, and/or PLCs.

The processor-based speech recognition device 300 may include one or more non-transitory computer- or processor-readable storage media such a non-volatile memory 306 and volatile memory 308. Non-volatile memory 306 may take a variety of forms, for example one or more read only memories (ROMs), one or more writeable memories, for instance EEPROM and/or or one or more FLASH memories. The volatile memory 308 may take a variety of forms, for example one or more random access memories (RAM) including static and/or dynamic random access memories. The various controllers 302, 304 and memories 306, 308 may be communicatively coupled via one or more buses (only one shown) 310, for instance instructions buses, data buses, address buses, power buses, etc.

The controllers 302, 304 may execute instructions stored in or by the memories 306, 308. The controllers 302, 304 may employ data, values, or other information stored in or by the memories 306, 308.

The processor-based speech recognition device 300 optionally includes one or more radios 312 and associated antennas 314 (only one shown) operable to wirelessly communicative couple the processor-based speech recognition device 300 to the headset 200. Such radio 312 and antenna 314 may be particularly suited to relatively short-range communications (e.g., 1 meter, 3 meters, 10 meters). The radio 312 and antenna 314 may take a variety of forms, for example a wireless transmitter, wireless receiver, or wireless transceiver. The radio 312 and antenna 314 may, for instance, be a radio suitable for short range communications, for example compatible or compliant with the BLUETOOTH® protocol. The range of the radio 312 and antenna 314 should be sufficient to ensure wireless communications in the expected work environment, for instance wireless communications with a processor-based headset 104, 200.

The processor-based speech recognition device 300 optionally includes one or more radios 316 and associated antennas 318 (only one shown) operable to wirelessly communicative couple the processor-based speech recognition device 300 to the backend computer system 110 (FIG. 1), for example via one or more antennas 112 (FIG. 1) of a wireless network or communications system. The radio 316 and antenna 318 may take a variety of forms, for example a wireless transmitter, wireless receiver, or wireless transceiver. The radio 316 and antenna 318 may, for instance, be a radio suitable for relatively longer range communications (e.g., greater than 10 meters), for example compatible or compliant with one or more variants of the IEEE 802.11 protocols (e.g., 802.11n protocol, 802.11ac protocol) or WI-FI® protocol. In many applications, the range of the radio 316 and antenna 318 should be sufficient to ensure wireless communications in the expected work environment, for instance wireless communications with one or more antennas 112 (FIG. 1) positioned throughout the work environment, but this is not necessary.

Figure 4:
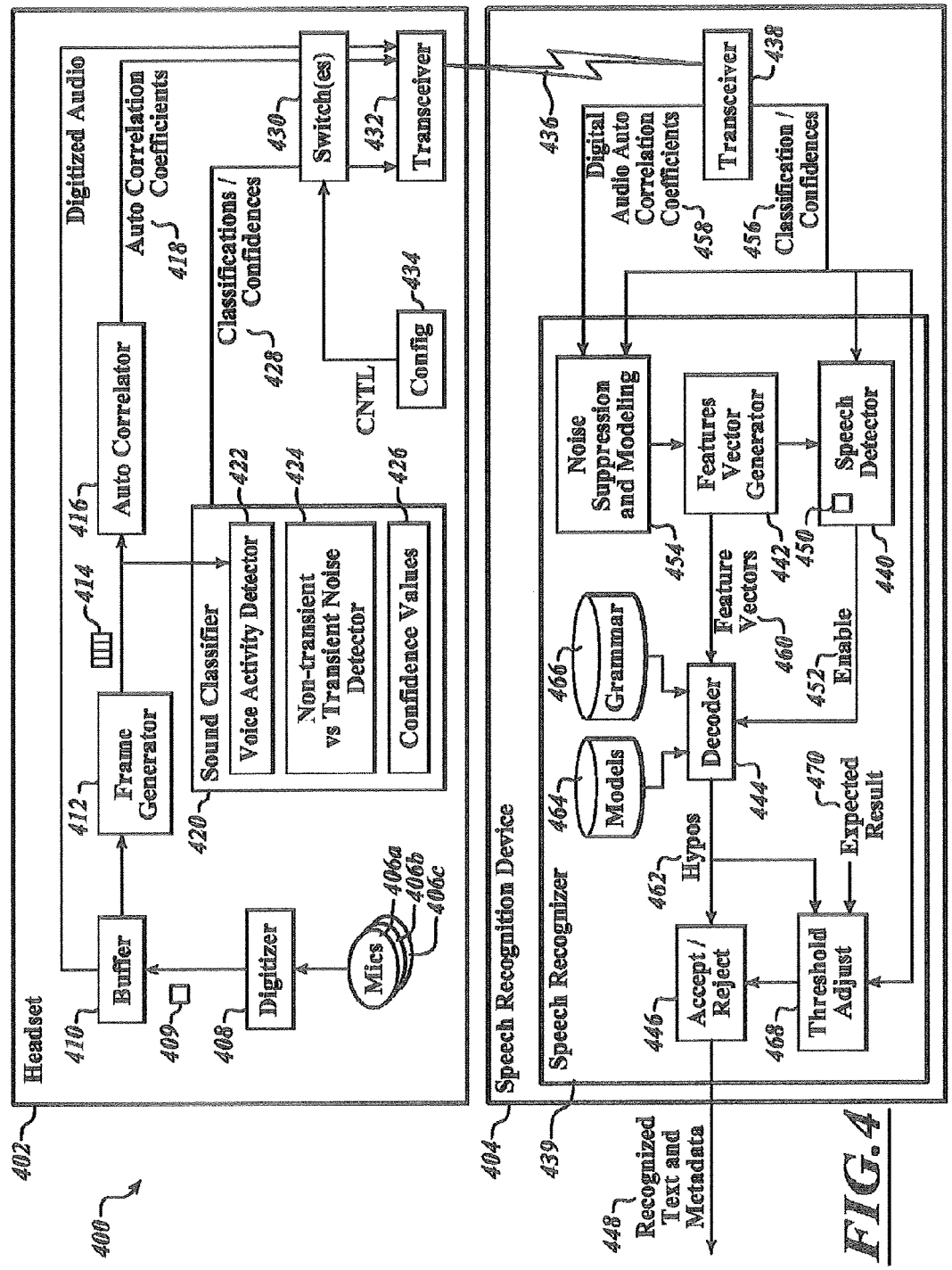
FIG. 4 is a functional block diagram of a headset and processor-based speech recognition device, identical or similar to that of FIGS. 1-3, according to one illustrated embodiment.

FIG. 4 shows, in functional block form, a speech detection and recognition system 400 including a headset portion 402 and a processor-based speech recognition device portion 404, according to one illustrated embodiment. The headset portion 402 may be implemented via the headset 200 (FIG. 2) and the processor-based speech recognition device portion 404 may be implement via the processor-based speech recognition device 300 (FIG. 3).

As previously explained, the headset 402 may include one or more microphones 406a-406c (three shown) which each produce analog audio signals representative of captured sounds, for example user speech, non-transient background noise (e.g., humming of machines) and transient background noise events (e.g., dropped pallet, vehicle horn or beeper, public address announcement).

Also as previously explained, a digitizer 408 digitizes the analog audio signals to produce digital audio signals 409. The digitizer 408 may, for example, take the form of one or more audio CODECs. Optionally, one or more buffers 410 may buffer the digital audio signals.

The digitized audio signals 409 (or buffered versions of digitized audio signals) are provided to a frame generator 412 which generates frames of audio. The frame generator divides the audio signal into segments, which are referred to as frames 414, for further processing. Each segment or frame 414 may, for example, be between approximately 10 milliseconds and approximately 32 milliseconds in duration. Such lengths or durations are not intended to be limiting, and longer (e.g., 100 milliseconds) or shorter segments or frames may be employed. Frames 414 are typically constructed from partially (e.g., 0-50%) temporally overlapping segments of audio. Data overlapping may be useful in eliminating artifacts that would otherwise be introduced by various subsequent signal processing operations. Frame generation is further described, for example in U.S. patent application Publication No. 2007/0143105.

An auto-correlator 416 generates or determines a respective set of auto-correlation coefficients 418 for each frame 414. The auto-correlation coefficients 418 are representative of spectral characteristics of the portion of the digitized audio signal 409 represented by the respective frame 414. In particular, the auto-correlator 416 may compute a set of auto-correlation coefficients 418 which parameterize a spectral envelope of the respective portions of the digitized audio signal 409. Generation and use of auto-correlation coefficients are further described, for example in U.S. patent application Publication No. 2007/0143105.

A sound classifier 420 classifies frames 414 as either: A) speech, B) non-transient background noise (e.g., humming of a machine), or C) transient noise event (e.g., announcement, pallet or package drop). The sound classifier 420 may employ techniques and structures such as those taught in U.S. patent application Publication No. 2003/0179888, for instance those described at paragraphs 0081-01140, although will also distinguish transient noise events from non-transient background noise. The sound classifier 420 may include a voice activity detector (VAD) 422 used to distinguish speech or voice from noise. The sound classifier 420 may also include a noise discriminator 424 to distinguish transient noise or sounds from non-transient noise or sounds. Alternatively, or additionally, the sound classifier 420 may include a confidence values generator 426 that produces confidence values or levels, which may be used in assessing various frames and/or classifications. For example, a confidence values generator 426 may calculate or otherwise generate probabilities or other metrics (i.e., confidence values) representative of an amount or level of confidence in a respective classification result. For instance, a difference between speech and transient noise event detection metrics may be determined, and their respective probabilities can be used to indicate the confidence in the classification results. Various system components (e.g., speech detector, decoder) may use the confidence values to improve performance. The sound classifier 420 provides the classifications and/or confidence values 428 to downstream components.

Note that the terms frames and fragments are used interchangeably throughout this specification to indicate information associated with a segment of audio. Also note that frames or fragments for the purposes of classification into speech, background noise, transient background noise, or non-transient background noise do not necessarily need to correlate one to one to frames or fragments generated for purposes of feature generation for other aspects of speech recognition, e.g., speech detection, training, decoding. They may have many different parameters, such as using different frame rates, amounts of overlap, number of samples, etc.

One or more switches 430 is/are selectively operated to either control delivery of information to a communications component (e.g., transceiver 432) and/or to control delivery of audio related information by the communications component (e.g., transceiver 432). The audio related information may, for example, include one or more of: classifications, confidence values, digitized audio signals or frames, autocorrelation coefficients, or other information or metadata associated with the digitized audio 409. The switch(es) 430 may be controlled based on a variety of criteria, for example system configuration information 434 or based on the determined classifications or confidence values 428 associated with respective frames 414, and/or based on generated or determined auto-correlation coefficients 418. This may advantageously limit the information being sent or transmitted to information that has been determined to likely be speech rather than noise. Thus, the headset 104, 200 will primarily only pass the corresponding information to the processor-based speech recognition device 106, 300 when it appears that the information corresponds to speech by the user.

The transceiver 432 may take a variety of forms, typically in the form of a radio or wireless transceiver. The transceiver 432 may employ any variety of communications protocols, for instance IEEE 802.11 protocols. The transceiver 432 may use various modulation techniques, including Code Division Multiple Access (CDMA), Time Division Multiple Access (TDMA), and Frequency Division Multiple Access (FDMA) to name a few. In some implementations, the transceiver 432 will take the form of a BLUETOOTH® compliant transceiver. As noted above, the transceiver 432 transmits audio related information 436, including the respective classifications 428 (i.e., speech, non-transient background noise, transient noise event) at least for each frame 414 initially classified as speech, to the processor-based speech recognition device portion 404.

The processor-based speech recognition device portion 404 decodes contiguous segments or sets of audio. The processor-based speech recognition device portion 404 typically includes at least a transceiver 438 and a speech recognizer 439 to process audio and produce digital textual or character representations (e.g., ASCII) and/or metadata 448 corresponding to the speech. The speech recognizer 439 may, for example, include one or more of a speech detector 440, feature vector generator 442, decoder 444, and accept/reject module 446.

The transceiver 438 may take a variety of forms, typically in the form of a radio or wireless transceiver. The transceiver 438 may employ any variety of communications protocols, for instance IEEE 802.11 protocols. The transceiver 438 may use various modulation techniques, including CDMA, TDMA, and FDMA to name a few. In some implementations, the transceiver 438 will take the form of a BLUETOOTH® compliant transceiver. The transceiver 438 of the processor-based speech recognition device portion 404 receives audio related information 436 from the paired transceiver 432 of the headset 402. The audio related information 436 may, for example, include classifications and/or confidence values 428, 456, auto-correlation coefficients 418, digitized audio 409, and/or digital audio in raw or compressed form of digitized audio (not shown) using, for example, a compression technique such as ADPCM.

Frame-by-frame classification is typically not very useful in determining which audio is actually speech that should be decoded. This is due to a number of reasons. For example, classification of individual frames of audio 414 may not be perfectly accurate, or frame classifications may alternate more rapidly between speech and non-speech than user speech actually alternates. Thus, the speech detector 440 of the processor-based speech recognition device portion 404 attempts to determine when a user starts speaking and/or stops speaking. In particular, the speech detector 440 determines which sets or segments 450 of contiguous frames 414 are likely speech, and hence which sets or segments 450 of contiguous frames 414 to decode. The speech detector 440 may, for instance, perform filtering on the classifications to prevent false detections and missed detections. The speech detector 440 may employ a speech detection algorithm. For example, for each set or segment 450 of frames 414 formed by a defined number of consecutive frames (e.g., 10 consecutive frames), the speech detector 440 may determine whether a total number or percentage of the frames 414 individually classified as speech by the sound classifier meets or exceeds a speech detection threshold (e.g., 8 frames, 80%) and mark the 10 frames along with all subsequent frames as speech until a stop condition is met. Additionally or alternatively, a speech detection stop condition could be defined as follows. For each set or segment 450 of frames 414 formed by the defined number of consecutive frames (e.g., 10 consecutive frames), the speech detector 440 may determine whether a total number or percentage of the frames individually classified as speech by the sound classifier 420 is equal to or less than a non-speech detection threshold (e.g., less than 5 frames, 50%).

The decoder 444 is operable to decode continuous segments of audio, between the determined start and stop of speech. Thus, an enable signal 452 may be supplied to the decoder 444 to turn ON the decoder 444 in response to determining that set or segment 450 of frames 414 satisfied or met the speech detection threshold. Additionally or alternatively, the enable signal 452 may be stopped or a disable signal supplied to the decoder to turn OFF the decoder 444 in response to determining that a set or segment 450 of frames 414 satisfied or met the non-speech detection threshold, or alternatively did not satisfy the speech detection threshold.

The speech detector 440 may further cause one or more frames 414 to be prepended and/or postpended to the sets or segments 450 of frames 414 to ensure that the entire utterance by the user is decoded, including those frames occurring temporally proximate to the detected beginning and/or ending of speech. For example, the speech detector 440, or some other component, may cause one or more frames 414 which occur temporally immediately before the detected or determined start of speech to be prepended to the set or segment 450 of frames 414. Also for example, the speech detector may cause one or more frames 414 which occur temporally immediately after the detected or determined end of speech to be postpended to the set or segment 450 of frames 414.

The processor-based speech recognition device portion 404 may advantageously include a noise suppression and modeling module 454. The noise suppression and modeling module 454 may receive audio related information from the transceiver 438, for example classification and/or confidence values, collectively 456, and/or auto-correlation coefficients and/or digitized audio, collectively 458. The noise suppression and modeling module 454 may also receive input from the speech detector

440. The noise suppression and modeling module 454 may implement any variety of noise suppression and/or modeling techniques or algorithms, for example spectral subtraction noise estimation, silence model estimation, background energy estimation, and/or signal-to-noise ratio estimation. The noise suppression and modeling module 454 supplies input to the features vector generator 442, decoder 444, and possibly other parts of the system.

The features vector generator 442 generates a vector, matrix, or other set of numbers, collectively denominated as feature vectors 460, representing the acoustic features of frames 414 of audio 409. The features vector generator 442 may employ input from the noise suppression and modeling module 454. Feature vector generators are generally described, for example in "Fundamentals of Speech Recognition", by Rabiner and Juang, 1993. The teachings of such may be modified to use the cleaned up signal from the noise suppression and modeling module 454, which as noted above may at least in part be based on the classifications (i.e., speech, non-transient background noise, transient noise event). The feature vector generator 442 supplies features vectors 460 to the decoder 444. As explained above, the decoder 444 may operate to decode audio when enabled or in an ON operational state.

The decoder 444 may optionally employ various types of information when performing decoding, to produce hypotheses 462. For example, the decoder 444 may employ various models from a models repository 464 stored on non-transitory computer or processor-readable storage media for example in volatile memory. Additionally, the decoder 444 may employ grammar models, templates or rules or other grammar or language models indicative logic 466, stored on non-transitory computer or processor-readable media for example in volatile memory.

The decoder 444 analyzes the feature vectors 460 in an attempt to determine what hypothesis to assign to the digitized audio 409. The decoder 444 typically employs probabilistic acoustic models from a library of models 464 to recognize speech. As noted above, the decoder 444 may additionally employ language model rules 466. The decoder 444 may compare features of the feature vector 460 with reference or sample representations of speech or speech models 464 and/or language models 466, in order to determine the word or other phrase that best matches the audio received at the microphone(s) 406.

As part of the recognition process, the decoder 444 may assign a confidence score or value, which is indicative of how closely the features of the feature vector 460 matches a given model, for example the closest matching model.

The decoder 444 provides hypotheses 462 along with associated confidence scores or values to the accept/reject module 446. In general, a hypothesis may contain one or more words, numbers, or phrases. The accept/reject module 446 may be implemented in logic executed by a processor or other integrated circuit device executing instructions, or alternatively may be implemented by a dedicated circuitry (e.g., dedicated digital circuit). The accept/reject module 446 computationally evaluates the hypotheses 462, accepting some and rejecting others. The confidence scores or values generated by the decoder 444 may be used by the accept/reject module 446 in evaluating the hypotheses. For example, a hypothesis or a portion thereof may be accepted if one or more confidence values or factors is or are above a defined acceptance threshold. Also for example, a hypothesis or a portion thereof may be ignored or rejected if one or more confidence values or factors is or are not above the defined acceptance threshold, or below a defined rejection threshold. Such an outcome may cause the system to prompt the user to repeat the speech input.

In response to accepting a hypothesis 462, the accept/reject module 446 may provide the accepted hypothesis 462 as recognized textual or character information and/or metadata 448, for example to a backend computer system 110 (FIG. 1) or some other component. The textual or character information and/or metadata 448 may take a variety of forms, typically some digital representation of textual or character information, for example represented in ASCII or UNICODE format, and associated metadata.

The processor-based speech recognition device portion 404 may optionally include a threshold adjust module 468, which adjusts the operation of the accept/reject module 446. The threshold adjust module 468 may determine adjustments based on the classifications or confidence values 456. The threshold adjust module 468 may also determine adjustments based on expected results information 470. The expected results information 470 represents the expected result or response from the user. For example, in some situations certain spoken input may be expected in a certain order. For instance, given a specific user and a prompt to the user to enter his password, the specific sequence of words that make up his password may be expected as the spoken phrase. Knowledge of the application and context, such as who is using the system and what he was prompted for, may be employed in determining whether to accept or reject a hypothesis. Use of expected results or responses is generally described, for example in U.S. patent application Publication No. 2006/0178882.

It may be advantageous to know whether each frame 414 of audio 409 represents speech, non-transient background noise, or transient noise events. Frames 414 that represent speech can be used to transform acoustic features 460 or models 464 so that the features better match the models. An example of such a transformation is vocal tract length normalization (VLT).

Knowing that a frame 414 represents non-transient background noise is useful in calculating estimates of non-transient background noise. Such estimates may be used in spectral subtraction and other de-noising algorithms, for example executed by noise suppression and modeling module 454. Frames 414 classified as non-transient background noise are used in determining the background noise estimate, while frames 414 not classified as non-transient background noise (i.e., speech, transient noise event) are not used in determining the background noise estimates. The classifications may also be used to determine which frames 414 are employed in updating a model 464 of the non-transient background noise, which may be used by the decoder 444 in performing decoding. Knowing that a frame 414 is part of a transient noise event may advantageously prevent the processor-based speech recognition device portion 404 from erroneously updating the background estimates or erroneously recognizing audio 409 that represents a transient noise event as user speech and consequently generating and accepting a false hypothesis.

The classifications may be used by the decoder 444 to adjust the confidence scores of words or phrases produced by the processor-based speech recognition device portion 404. The classifications may be used to prevent background sounds (i.e., noise) from erroneously being recognized as speech. Alternatively or additionally, the classifications may be used to adjust a rejection threshold (i.e., threshold to which a word's confidence score is compared) by the threshold adjustment module 468, again to prevent background sounds (i.e., noise) from erroneously being recognized as speech. For example, for each potential recognized word or hypothesis, let:

$$\text{Source\_index} = (\text{Speech\_time} - \text{Environmment\_noise\_time})/\text{Total\_time}$$

where:
Speech_time is the portion of the word that was classified as speech by the sound classifier,
Environment_noise_time is the portion of the word that was classified as transient noise event by the sound classifier, and
Total_time is the total length of the word.

Then, if source_index is less than a defined threshold, a confidence score or value logically associated with the word may be lowered, or a rejection threshold logically associated with the word may be increased to make it less likely that the word is accepted. Alternatively, a confidence score or value or rejection threshold logically associated with the word may be adjusted by a variable amount, based at least in part on the value of source_index. Note that in this specification, the term word is used to represent an item in the vocabulary, which correspond to a word or a sequence of words that are to be spoken together. Alternatively, environment_noise_time could be defined as the portion of the word that was not classified as speech by the sound classifier. Or, source_index could alternatively be calculated based on confidences for frames in the word, where the confidences for frames in the word are confidences that the frame represent speech, non-transient background noise, and/or transient background noise. Other variations of the calculations will be evident to those skilled in the art.

Notably, FIG. 4 illustrates, in block diagram form, one possible embodiment of the headset 402 and the processor-based speech recognition device 404. As may be appreciated, the block diagram shows various lines indicating operable interconnections between different functional blocks or components. However, various of the components and functional blocks illustrated might be implemented in or by the circuitry of the headset 200 (FIG. 2), such as in or by the control subsystem 212. Various of the components and functional blocks illustrated might be implemented in or by the circuitry of the processor-based speech recognition device 300 (FIG. 3). Accordingly, the figures illustrate exemplary functional circuit blocks and do not necessarily illustrate individual chip components. The Talkman® product commercially available from VOCOLLECT may be modified to implement some of the structures and/or functionality of the processor-based speech recognition device 300, 404.

As described in U.S. patent application Publication No. 2003/0179888 (Burnett, et al.), some implementations may operate on a relative measurement of the sound levels of the primary microphone channel with respect to the other microphone channel and the variation or difference in this relative measurement over its baseline. The measurements made over periods where non-transient noise is detected are used to form a baseline measurement. This baseline measurement may be filtered to avoid rapid fluctuation. The baseline may then be stored in memory and retrieved as necessary. The relative measurement of sound signal levels of the primary microphone channel with respect to the other microphone channel increasing by some predetermined amount with respect to the baseline indicates that a user is speaking.

For example, when the user speaks, the ratio of the sound signal levels from the primary and secondary microphones 406a, 406b, 406c will change. Preferably that change is significant with respect to the baseline variation, exceeding the baseline difference by a threshold or predetermined amount. That difference may be measured in several ways (and may be represented as a ratio), such as described in previous applications filed in the names of Burnett or Byford. Of course, other algorithms may also be utilized. When the user is speaking, the signal level from the primary microphone 406a will increase significantly relative to the signal level from the secondary microphone(s) 406b, 406c. Such may be due to the positioning, orientation and/or inherent characteristics of the primary microphone 406a relative to the secondary microphone(s) 406b, 406c. The increase in the signal level from the primary microphone 406a and/or the relative difference in the signal levels of the secondary microphones 406b, 406c is detected by the circuitry that implements the measurement algorithm. With respect to the baseline variation, which was earlier determined, a determination is made with respect to whether the user is speaking, based on the change in signal characteristics such as the ratio of the signal levels from the primary microphone 406a and secondary microphone 406b with respect to the baseline measured when the user is not speaking. For example, a variation between the signal characteristics of the respective digitized audio signals over the baseline variation in excess of a certain amount indicates speech.

Figure 5:
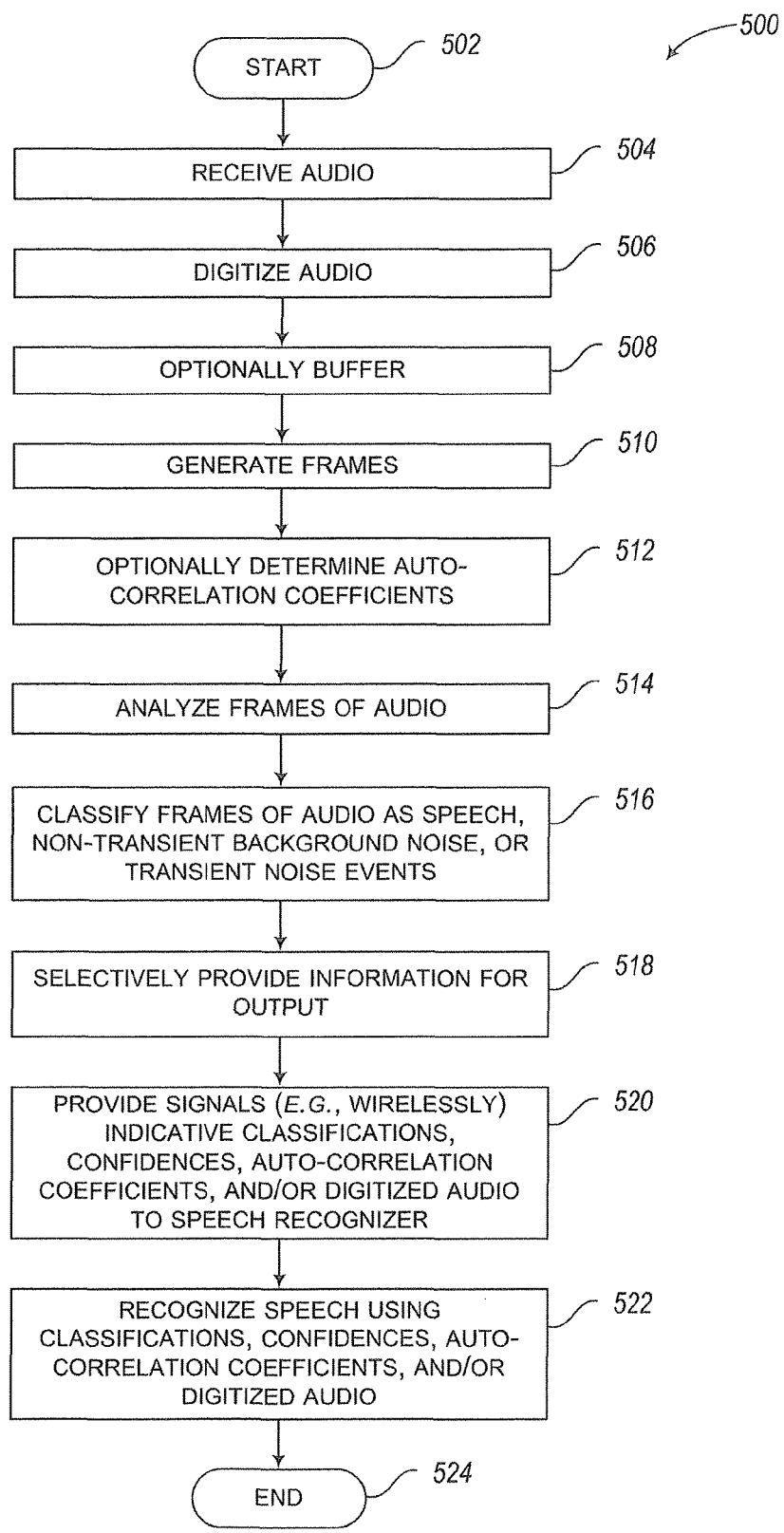
FIG. 5 is a high level flow diagram of operation of at least one of a headset and processor-based speech recognition device, identical or similar to that of FIGS. 1-4, according to one illustrated embodiment.

FIG. 5 shows a high level method 500 of operation in a speech recognition system, for example the speech recognition system 102 (FIG. 1) which includes a headset 104 and processor-based speech recognition device 106, according to one illustrated embodiment.

The method 500 starts at 502. For example, the method 500 may start in response to an ON/OFF switch (not shown) being operated, power being supplied, or a prompt to the user.

At 504, audio is received via one or more microphones. The microphones may be part of a headset, worn by a user. The microphones may include one or more primary microphones positioned or configured and/or oriented to predominately capture speech or utterances from the mouth of the user. The microphones may include one or more secondary microphones include one or more positioned or configured and/or oriented to predominately capture sounds (i.e., noise) which do not come from the mouth of the user.

At 506, a digitizer (e.g., CODEC) digitizes analog signals from the microphone to create digital audio signals. Optionally at 508, one or more buffers may buffer the audio signals. The audio signals may be buffered, allowing time for processing downstream of the digitizer in the flow of audio signals. Various aspects of analog-to-digital (A/D) and digital-to-analog (D/A) conversion and converters (ADCs, DACs) are discussed in U.S. patent application Publication No. 2007/0143105.

At 510, a frame generator generates or creates frames of audio (i.e., digitized audio signals). As noted above, the frame generator divides the audio signal into frames. Typically, frames are partially (e.g., 0-50%) overlapping with one another. Frame generation is further described, for example in U.S. patent application Publication No. 2007/0143105. While not illustrated, windowing may be applied. For example, a Hamming window may be applied to the samples of each frame, to smooth a frequency content of the frame and reduce spectral leakage that might otherwise occur. Various aspects of windowing are discussed in U.S. patent application Publication No. 2007/0143105.

Optionally at 512, an auto-correlator generates or determines a respective set of auto-correlation coefficients for each frame. As previously explained, auto-correlation coefficients are representative of spectral characteristics of the portion of the digitized audio signal represented by the respective frame. Generation and use of auto-correlation coefficients are further described, for example in U.S. patent application Publication No. 2007/0143105.

At 514, a sound classifier analyzes each of a plurality of frames of audio. At 516, based at least in part on the analysis the sound classifier classifies each of the frames of audio as either speech, non-transient background noise, or transient noise events.

For example, the sound classifier may first determine whether dominant sounds in a frame likely came from a mouth of the user. Techniques and structures such as those taught in U.S. patent application Publication No. 2003/0179888 may be employed, for instance those described at paragraphs 0081-0114. Frames with a respective "gain" (as defined in U.S. patent application Publication No. 2003/0179888) above a threshold may be classified as speech. Remaining frames are treated as noise (i.e., non-speech), and may be classified as either background noise (i.e., non-transient noises) or noise events (i.e., transient noises). To differentiate between transient noise events and non-transient noise, the sound classifier may employ a noise detection metric (e.g., energy). The sound classifier may determine a noise detection metric for each frame, as well as an average noise detection metric over time. The sound classifier may compare the determined noise detection metric for the specific frame to the average noise detection metric over time. Suitably modified techniques and structures such as those taught in U.S. patent application Publication No. 2003/0179888 may be employed, for instance those described at paragraphs 0102-0103. The average noise detection metric (e.g., energy) may advantageously be based only on those frames which were classified as non-transient background noise.

The sound classifier may compare the determined noise detection metric for the specific frame to the average noise detection metric by taking their ratio and comparing the result to a threshold. If the ratio is greater than the threshold, the sound classifier classifies the frame as a transient noise event, and otherwise classifies the frame as non-transient background noise. Of course, these calculations can be done using a different scale and changing the mechanics of the comparison as appropriate, (such as by using decibels and an arithmetic difference).

Various approaches to analyzing and classifying fragments may be employed, some of which are discussed in more detail below with respect to other low level methods of operation. For example, approaches employed by voice activity detectors used with input from a single microphone may be employed. Various approaches may remove noise from a digitized audio signal, for instance via spectral subtraction, prior to calculating or otherwise determining a metric. Additionally, or alternatively, frequency weighting may be applied, before calculating or otherwise determining the metrics (e.g., energy). The metrics may be calculated or otherwise determined using input signals from any of the microphones.

Notably, the classification is only an assessment. In some instances the assessment may not actually be correct, for example some audio fragments classified a speech may actually be non-transient background noise, or more likely a transient noise event. Alternatively, some audio fragments classified as either non-transient background noise or transient noise event may actually be speech. Instances of incorrect classification of frames are expected, hence the denomination of frames as being classified as speech, non-transient background noise, or transient noise event should not be considered as requiring that those frames actually represent the assigned classification, and hence should not be considered limiting.

At 518, information is selectively provided for output. For example, as previously explained, one or more switches is/are selectively operated to either control delivery of information to a communications component and/or to control delivery of information by the communications component. The information may, for example, include one or more of: classifications, confidence values, digitized audio signals or frames, autocorrelation coefficients, or other information or metadata associated with the digitized audio. The switch(es) may be controlled based on various criteria, for example the determined classifications or confidence values associated with respective frames, and/or based on a system configuration setting. This may advantageously limit the information being sent to be information which has been classified (i.e., determined to likely be) as speech rather than noise. Thus, in one embodiment, the headset 104, 200 will primarily only pass the information to the processor-based speech recognition device 106, 300 when the information appears to correspond to speech, even in the presence of extraneous sounds such as non-transient background noise and transient noise events.

At 520, a communications component of the headset provides signals indicative of the audio to a speech recognizer component (e.g., processor-based speech recognition device 106, 300). The audio indicative signals may be indicative of, for example, classifications, confidence values, auto-correlation coefficients, digitized audio, and/or frames. The communications component preferably provides signals that identify corresponding pieces of data among the types of data sent, for example to which portion of digitized audio a given classification corresponds.

The communications component may, for example, take the form of a radio, (e.g., transmitter, transceiver) operable to wirelessly transmit information. Alternatively, the communications component may, for example, take the form of a communications port, for instance a wired or optical port operable to transmit information over a physical media transport path such as a wire or optical cable. In addition to the classification information, the communications component may also transmit signals indicative of all or a portion of the digitized audio. Operation of the communications component may, for example, include converting to RF or microwave carrier frequencies, modulating, demodulating, amplifying, and may or may not include use of spread spectrum techniques. As previously noted, the radio may take a variety of forms, for example a BLUETOOTH® compliant radio. Techniques and structures such as those taught in U.S. patent application Publication No. 2007/0143105 may be employed, for instance those described at paragraphs 0081-0114.

At 522, a speech recognizer employs the received classifications confidences, autocorrelation coefficients, and/or digitized audio to recognize speech.

The method 500 terminates at 524. Alternatively, the method 500 may repeat, for example until an ON/OFF switch (not shown) is operated, power is cut off, or in response to no detection of sound at a headset over an extended period.

Figure 6:
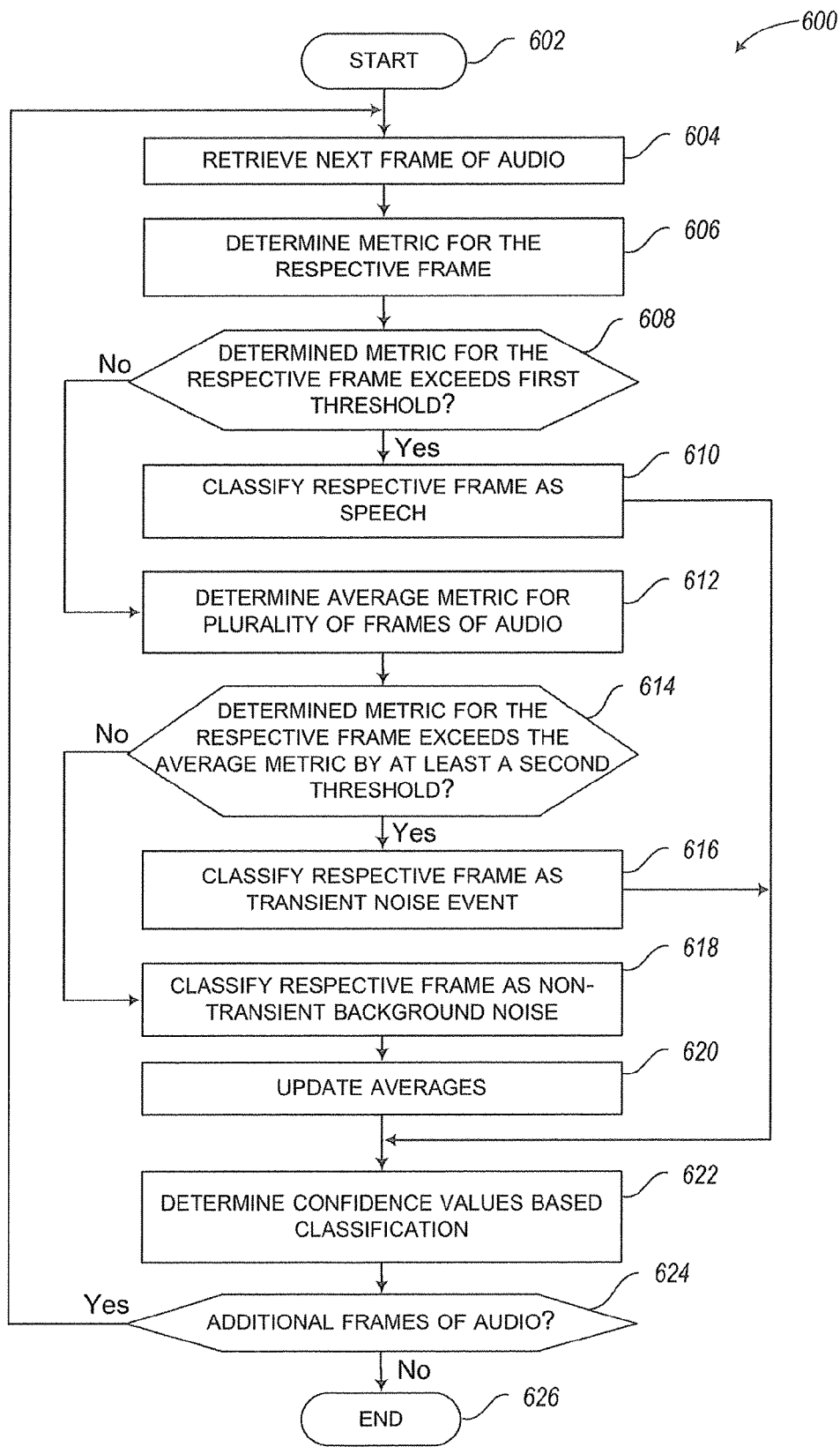
FIG. 6 is a low level flow diagram of operation of a sound classifier in a headset the headset identical or similar to that of FIGS. 1, 2 and 4, according to one illustrated embodiment.

FIG. 6 shows a low level method 600 of operation of a sound classifier in a headset, according to one illustrated embodiment. The method 600 of operation of a classifier may, for example, be performed or executed as part of, or in conjunction with the method 500 (FIG. 5).

The method 600 starts at 602. For example, the method 600 may start in response to a call from the method 500 or in response to a prompt to the user.

At 604, the sound classifier retrieves a next frame for processing. The sound classifier may retrieve frames from a buffer.

At 606, the sound classifier determines a first metric for the respective frame of audio. For example, the sound classifier may determine a ratio of energies for the frame of audio.

At 608, the sound classifier determines whether the determined first metric for the respective frame exceeds a first threshold. If the sound classifier determines that the determined metric for the respective frame exceeds the first threshold, which may be based on a previously calculated first average or baseline value of the first metric, the sound classifier classifies the respective frame as being speech at 610.

As previously noted, the first average or baseline value of the metric may be based only on those frames of audio which were previously classified as non-transient background noise, for instance continuous noise from machines.

At 612, the sound classifier determines a second average metric (e.g., energy) for a plurality of frames of audio. As previously noted, the second average metric may be based only on those frames of audio which were previously classified as non-transient background noise, for instance continuous noise from machines.

At 614, the sound classifier determines whether the determined second metric for the respective frame exceeds the second average metric by at least a second threshold, which may be based on a previously calculated second average or baseline value of the second metric. Typically, the second threshold will not be equal to the first threshold, but in some instances the two thresholds may be equal. If the sound classifier determines that the determined second metric for the respective frame exceeds the second average metric by at least the second threshold, the sound classifier classifies the respective frame as being a transient noise event at 616.

If on the other hand the sound classifier determines that the determined second metric for the respective frame does not exceed the second average metric by at least the second threshold, the sound classifier classifies the frame as non-transient background noise at 618. At 620, the sound classifier updates the average metrics, particularly if the respective frame is being classified as non-transient background noise.

While diagrammatically represented as separate acts, classification into speech, transient noise events, and non-transient background noise may be concurrent or a single decision or operation, for example based on one or more metrics such as energy or confidence values.

Optionally at 622, the sound classifier may additionally or alternatively determine confidence values that reflect confidence in the assigned classification of the frame. The confidence values may be based on, for example, how far above or below the first or second metric is above or below its respective threshold.

At 624, the sound classifier determines if there are additional frames of audio to be classified. If the sound classifier determines that there are additional frames of audio to be classified, control returns to 604. Otherwise the method 600 may terminate at 626, until called again. In some implementations, the method 600 may automatically repeat or run continually, instead of terminating or ending.

Figure 7:
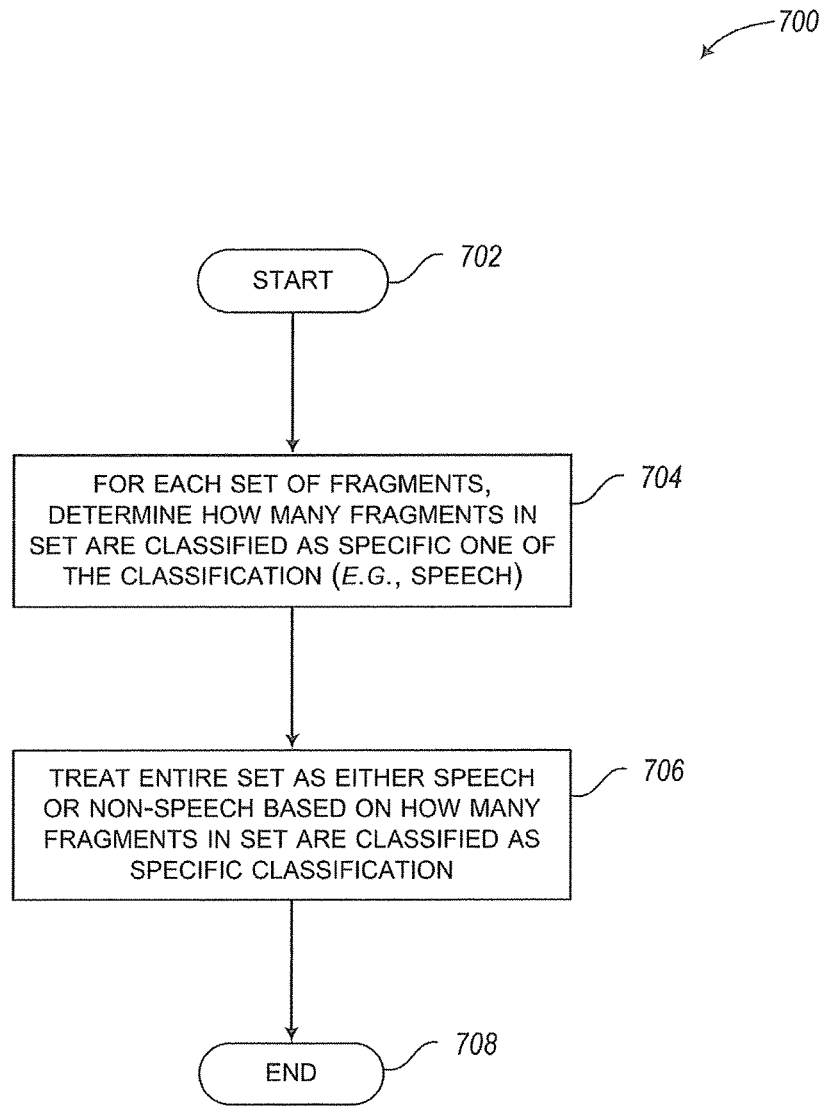
FIG. 7 is a low level flow diagram of operation of a processor-based speech recognition device, identical or similar to that of FIGS. 1, 3 and 4, according to one illustrated embodiment.

FIG. 7 shows a low level method 700 of operation of a processor-based speech recognition device in a speech recognition system to recognize a start and/or stop of speech, according to one illustrated embodiment. It may be useful in speech recognition to detect at least one of a start or a stop of speech. Detection of the start or a stop of speech may advantageously be based at least in part on the classifications of the frames of audio. The method 700 may, for example, be performed or executed as part of, or in conjunction with the method 500 (FIG. 5).

The method 700 starts at 702, for example in response to at least a speech detector of the processor-based speech recognition device receiving audio related information, for example from a headset. In some implementations, the method 700 may continuously operate while the processor-based speech recognition device is in an ON or powered state.

At 704, for each set of two or more fragments, the speech detector determines how many fragments in the set are classified as a first defined one of the classifications. For example, the speech detector may determine how many fragments in a set are classified as speech. Alternatively, or additionally, the speech detector may determine how many fragments in a set are classified as non-speech (i.e., non-transient background noise, transient noise event).

At 706, the speech detector treats the entire set of fragments as either speech or non-speech based on the how many of the fragments in the set are classified as the first defined one of the classifications.

The method 700 may terminate at 708. Alternatively, the method 700 may repeat, for example periodically or continuously. The method 700 may, for example, operate in parallel, for example as two or more threads executing on a multi-threaded processor, each thread handling respective sets of fragments.

Figure 8:
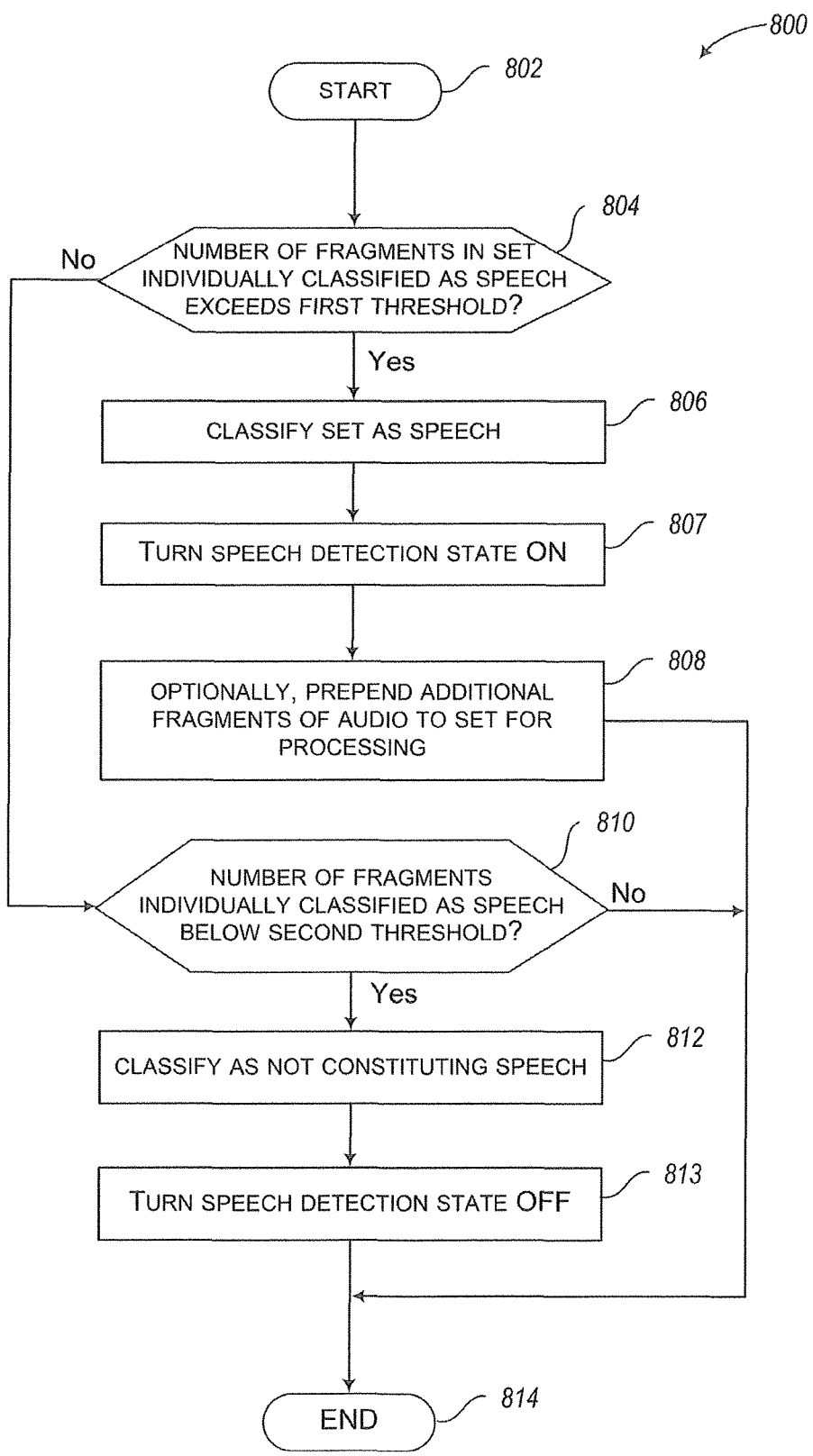
FIG. 8 is a low level flow diagram of operation of a processor-based speech recognition device, identical or similar to that of FIGS. 1, 3 and 4, according to one illustrated embodiment.

FIG. 8 shows a low level method 800 of operation of a processor-based speech recognition device in a speech recognition system to identify sets or segments of speech for further processing, according to one illustrated embodiment. As noted above, it may be useful in speech recognition to detect sets or segments of speech, via a start and/or stop of speech. Capturing and processing complete sets or segments may be particularly advantageous. The method 800 may, for example, be performed or executed as part of, or in conjunction with the method 500 (FIG. 5).

The method 800 starts at 802, for example in response to at least a speech detector of the processor-based speech recognition device receiving audio related information, for example from a headset. In some implementations, the method 800 may continuously operate while the processor-based speech recognition device is in an ON or powered state.

At 804, the speech detector determines whether a total number of fragments in a set of fragments which are individually classified by the sound classifier as speech exceeds a first speech detection threshold.

If the total number of fragments in the set of fragments individually classified as speech exceeds the first speech detection threshold, the speech detector or some other component identifies or logically marks the set of fragments as constituting speech, at 806.

At 807, the speech detector turns the speech detection state to ON. Subsequent frames or fragments will then be classified as speech, until the speech detection state is set to OFF.

Optionally at 808, for any sets of fragments identified as constituting speech, the speech detector or some other component of the processor-based speech recognition device prepends additional fragments of audio to the set of fragments. Such captures fragments of audio which occurred immediately before a start of the set or segment of speech. Thus, such prepends a number of audio fragments which temporally occurred immediately before the earliest fragment in the set of fragments.

At 810, the speech detector determines whether a total number of fragments in a set of fragments which are individually classified by the sound classifier as speech is below a second noise detection threshold.

If the total number of fragments in the set of fragments individually classified as speech is below the second noise detection threshold, the speech detector or some other component identifies or logically marks the set of fragments as constituting non-speech, at 812.

At 813, the speech detector turns the speech detection state to OFF.

While certain thresholds and relative magnitudes with respect to those thresholds are described, other thresholds and relative magnitudes may be employed. For example, instead of speech being detected when the number of fragments classified as speech in a set of fragments exceeds a speech detection threshold, speech may likewise be detected when the number of fragments classified as noise in a set is below a noise detection threshold. Approaches that employ techniques in addition to, or in place of, determining the total number of fragments classified one way or the other may be employed. For instance, percentages of fragments in a set may be employed, rather than absolute numbers. In such implementations, thresholds may represent percentages.

The method 800 may terminate at 814. Alternatively, the method 800 may repeat, for example periodically or continuously. The method 800 may, for example, operate in parallel, for example as two or more threads executing on a multi-threaded processor, each thread handling respective sets of fragments.

Figure 9:
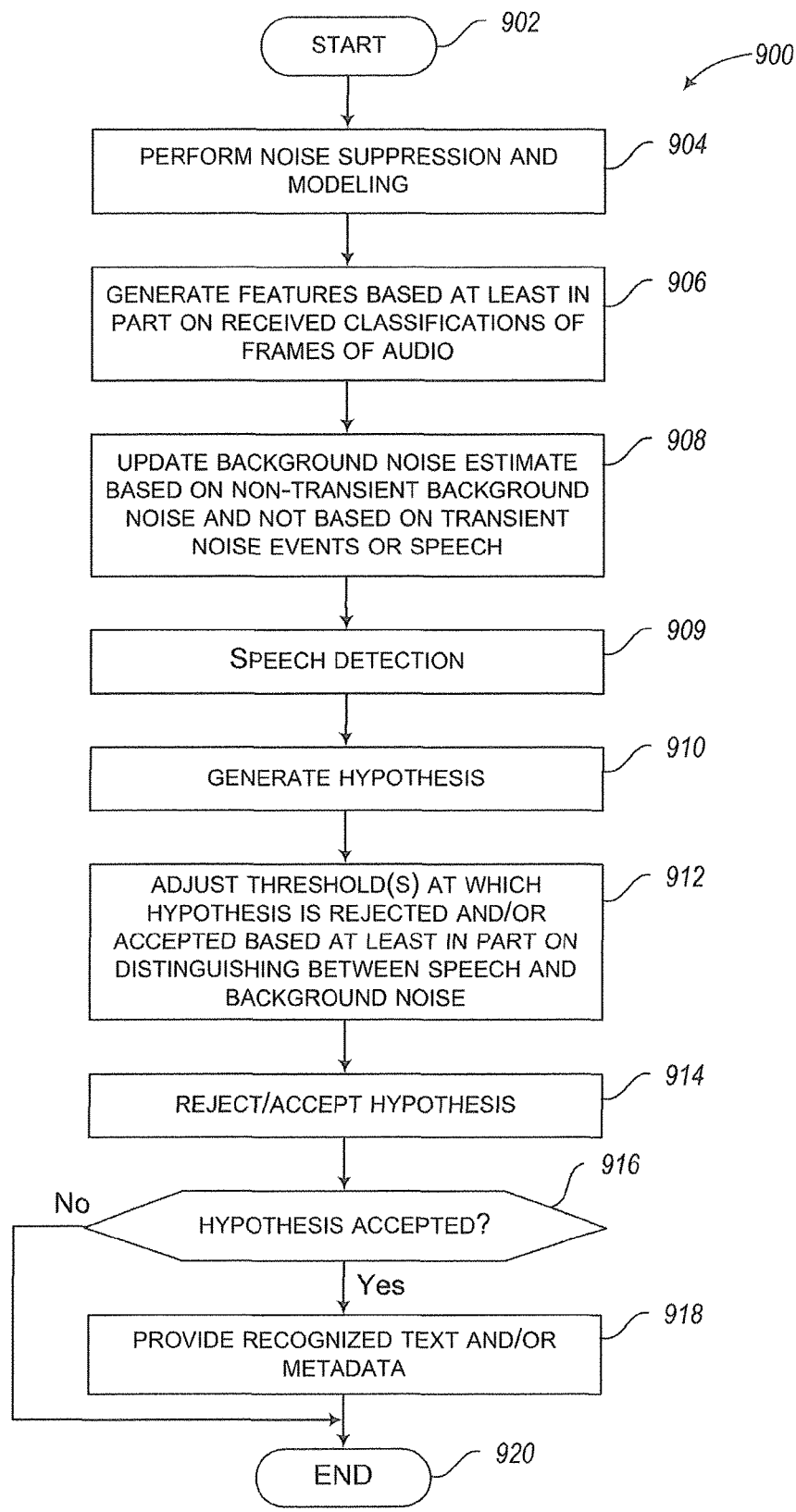
FIG. 9 is a low level flow diagram of operation of a processor-based speech recognition device, identical or similar to that of FIGS. 1, 3 and 4, according to one illustrated embodiment.

FIG. 9 shows a low level method 900 of operation of a processor-based speech recognition device in a speech recognition system to identify segments of speech for further processing, according to one illustrated embodiment. The method 900 may, for example, be performed or executed as part of, or in conjunction with the method 500 (FIG. 5), and may be performed in addition to the speech detection methods 700, 800 generally illustrated in FIGS. 7 and 8.

The method 900 starts at 902, for example in response to a processor-based speech recognition device receiving audio related information, for example from a headset. In some implementations, the method 900 may continuously operate while the processor-based speech recognition device is in an ON or powered state.

Optionally at 904, a noise suppression and modeling module performs noise suppression and modeling based on at least one of the classifications, confidence values, auto-correlation coefficients, and/or the digitized audio.

At 906, a features vector generator generates features based at least in part on digitized audio, frames, or autocorrelation data. Generation of feature vectors is generally described in U.S. Pat. No. 7,865,362. However, one implementation may advantageously employ the classifications of the fragments. For example, the vector generator will typically only generate features vectors based on fragments classified as speech, and not on fragments classified as non-speech (i.e., non-transient background noise or transient noise events).

At 908, a background noise estimate may be updated. The background noise estimate is preferably updated using information specific to fragments classified as, or sets of fragments identified as, non-transient background noise, and not based on those fragments or sets of fragments identified as transient noise events or speech.

At 909, speech detection is performed.

At 910, a decoder generates or produces one or more hypotheses. The decoder employs the features vector generated by the features vector generator. The decoder may also employ other information. For example, the decoder may employ models from a model repository stored on non-transitory computer- or processor-readable media such as volatile memory. Additionally, the decoder may, for example employ grammar rules or language models from a grammar repository stored on non-transitory computer- or processor-readable media such as volatile memory.

The decoder may be selectively controlled to only process those sets of fragments previously identified as likely being speech, rather than non-speech. For instance, an enable signal may be supplied, for instance via the speech detector, to cause the decoder to process and form a hypothesis only for those sets of fragments previously identified as likely being speech.

Decoder operation is generally described in U.S. Pat. No. 7,865,362. However, the present implementation may advantageously selectively operate the decoder using the classifications, processing sets of fragments previously identified as likely being speech rather than those identified as non-speech (i.e., non-transient background noise, transient noise events). By separately identifying transient noise events, the system is able to advantageously eliminate what might be described as false positives. That is the system may be able to eliminate erroneous recognitions of sounds that are very similar to speech (e.g., public address announcements), but which are considered noise with respect to the target or desired speech which is that spoken by the user.

At 912, a threshold adjust module may selectively adjust threshold(s) used by an accept/reject module for accepting or rejecting a word of a hypothesis from the decoder. The threshold adjustment may advantageously be based at least in part on classifications of the frames corresponding to the word, for instance distinctions between being classified as speech versus a non-transient background noise versus a transient noise event. The threshold adjust may additionally, or alternatively, employ an expected result. Threshold adjustment, including use of expected results, is generally described in U.S. Pat. No. 7,865,362. However, the present implementation may advantageously selectively operate the threshold adjustment module using the classifications. Alternatively or additionally, the confidence score of a word in the hypothesis can be adjusted based at least in part on the classifications of the frames corresponding to the word. In this case, it may not be necessary to adjust an acceptance or rejection threshold.

At 914, the accept/reject hypothesis module determines whether to accept or reject the hypothesis, for example by comparing a confidence score of a word in the hypothesis to a threshold. At 916, the accept/reject hypothesis module determines whether the hypothesis is accepted. Notable acts 914 and 916 may be combined. Hypothesis acceptance and rejection are generally described in U.S. Pat. No. 7,865,362. If the hypothesis is accepted, the processor-based recognition device outputs recognized text and/or metadata at 918. Otherwise, the processor-based recognition device may reprocess the set of fragments, provide an indication that the input was not recognized, and simply attempt to process the next set of fragments.

The method 900 may terminate at 920. Alternatively, the method 900 may repeat, for example periodically or continuously. The method 900 may, for example, operate in parallel, for example as two or more threads executing on a multi-threaded processor, each thread handling respective sets of fragments.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other speech driven systems and associated speech recognition systems for use therewith, not necessarily the exemplary speech driven systems and speech recognition systems generally described above.

For example, many components and/or functions may be moved or relocated. For instance, certain components housed in the headset may be moved to the processor-based speech recognition device. Alternatively, certain components housed in the processor-based speech recognition device may be moved to the headset. Additionally, or alternatively, certain components of the processor-based speech recognition device may be moved downstream, for example to the backend computer system or some intermediary computer system between the processor-based speech recognition device and the backend computer system.

Also for example, one or more of the components may not be worn by the user. For instance, the processor-based speech recognition device may be fixed to stationary structures (e.g., walls, ceilings) or attached to moveable structures (e.g., vehicles) to move therewith. Also for example, one or more microphones may be provided separately from the headset. Such microphones may be worn by the user, or may not be worn by the user. For instance, one or more microphones may not be worn, but rather provided separate from the headset. Secondary microphones may be particularly suited to being provided either separately from the headset or not worn by the user.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. The present subject matter may be implemented via microprocessors and/or co-processors. However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a non-transitory computer- or processor-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory computer- or processor-readable medium" can be any element that can store the program associated with logic and/or information for use by or in connection with the instruction execution system, apparatus, and/or device. The non-transitory computer- or processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

Many of the methods described herein can be performed with variations. For example, many of the methods may include additional acts, omit some acts, and/or perform acts in a different order than as illustrated or described.

The various embodiments described above can be combined to provide further embodiments. The teachings of U.S. Publication Nos. 2003/0179888, 2003/0228023, 2004/0001997 A1, 2004/0002243 A1, 2004/0003136 A1, 2004/0059579 A1, 2005/0010418 A1, 2005/0010892 A1, 2005/0070337 A1, 2005/0071158 A1, 2005/0095899 A1, 2005/0200632 A1, 2005/0242180 A1, 2005/0272401 A1, 2005/0286717 A1, 2006/0003785 A1, 2006/0178882 A1, 2006/0178886 A1, 2006/0182085 A1, 2007/0016460 A1, 2008/0031441 A1, 2008/0032533 A1, 2008/0300016 A1, 2010/0052871 A1, 2011/0029312 A1, 2011/0029313 A1, 2011/0040564 A1, 2011/0056723 A1, 2011/0287751 A1, 2012/0066600 A1, U.S. Pat. Nos. 6,910,911, 7,052,799, 7,146,315, 7,316,354, 7,391,863, 7,442,060, 7,496,387, 7,609,669, 7,664,657, 7,734,361, 7,773,767, 7,827,032, 7,865,362, 7,885,419, 7,895,039, 7,996,002, 8,128,422, 8,160,287, 8,200,495, 8,233,924, and 8,241,053, are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a system comprising memory and a processor for executing instructions stored in the memory, the instructions comprising a sound classifier, the method comprising:
   receiving an audio signal from an audio input device;
   generating a plurality of frames from the audio signal;
   analyzing, using the sound classifier, each of the plurality of frames of audio;
   classifying, using the sound classifier, a first number of the frames of audio as non-transient background noise;
   classifying, using the sound classifier, a second number of the frames of audio as transient noise events;
   updating, using the system, a background noise estimate using the audio corresponding to the frames classified as non-transient background noise and not using the audio corresponding to the frames classified as transient noise events; and
   providing, using the sound classifier, signals indicative of at least the classifications of the frames of audio to the system.

2. The method of operation of claim 1, comprising providing input to the sound classifier from at least two microphones.

3. The method of operation of claim 1, wherein providing the signals indicative of at least the classifications of the frames of audio includes wirelessly providing the signals with at least a logical relationship to respective data that represents audio of at least some of the frames of audio.

4. The method of operation of claim 3, wherein the respective data that represents audio of at least some of the frames of audio includes at least one of autocorrelation coefficients or digitized audio fragments.

5. The method of operation of claim 3, wherein classifying a first number of the frames of audio as non-transient background noise by the sound classifier includes, for each frame of audio determining a metric for the respective frame, comparing the determined metric for the respective frame to an average metric for a plurality of frames of audio, classifying the respective frame as a transient noise if the determined metric for the respective frame exceeds the average metric for the plurality of frames of audio by at least a first threshold, and otherwise classifying the respective frame as a non-transient background noise.

6. A headset, comprising:
   a first microphone for receiving audio input;
   a memory; and
   a processor for executing instructions stored in the memory, the instructions comprising a sound classifier, wherein, when executing the sound classifier, the processor is configured for:
      receiving a plurality of frames of audio generated from the audio input received by the first microphone;
      analyzing each of the plurality of frames of audio;
      classifying a first number of the frames of audio as speech;

classifying a second number of the frames of audio as non-transient background noise;

classifying a third number of the frames of audio as transient noise events; and transmitting signals indicative of at least the classifications of the frames of audio to a speech recognition system.

7. The headset of claim 6, comprising a second microphone for receiving audio input, wherein, when executing the sound classifier, the processor is configured for receiving a plurality of frames of audio generated from the audio input received by the second microphone.

8. The headset of claim 6, wherein transmitting signals indicative of at least the classifications of the frames of audio comprises wirelessly providing the signals with at least a logical relationship to respective data that represents audio of at least some of the frames of audio.

9. The headset of claim 8, wherein the respective data that represents audio of at least some of the frames of audio includes at least one of autocorrelation coefficients or digitized audio fragments.

10. The headset of claim 8, wherein classifying a second number of the frames of audio as non-transient background noise comprises for each frame of audio:

determining a metric for the respective frame;

comparing the determined metric for the respective frame to an average metric for a plurality of frames of audio; and classifying the respective frame as a transient noise if the determined metric for the respective frame exceeds the average metric for the plurality of frames of audio by at least a first threshold and otherwise classifying the respective frame as a non-transient background noise.

11. The headset of claim 6, wherein:

the headset wirelessly transmits the signals indicative of at least the classifications of the frames of audio to a speech recognition system separate from the headset that implements a speech recognizer; and the speech recognizer comprises a speech detector configured for detecting, using the classifications, at least one of a start or a stop of speech.

12. The headset of claim 11, wherein detecting at least one of a start or a stop of speech comprises for each of a set of two or more fragments:

determining how many of the fragments in the set are classified as a first one of the classifications; and treating the entire set as either speech or non-speech based on how many of the fragments in the set are classified as the first one of the classifications.

13. The headset of claim 12, wherein detecting a start of speech comprises identifying a set of fragments in which the number of fragments individually classified as speech exceeds a threshold as constituting speech.

14. The headset of claim 13, comprising for sets of fragments identified as speech, at least one of prepending or postpending additional fragments of audio to the respective set for processing, where the additional fragments of audio occurred immediately before or immediately after the audio fragments of the respective set of fragments.

15. The headset of claim 6, wherein:

the headset wirelessly transmits the signals indicative of at least the classifications of the frames of audio to a speech recognition system separate from the headset that implements a speech recognizer; and the speech recognizer is configured for adjusting a threshold at which a recognized hypothesis based on the audio is either rejected or accepted based at least in part on distinguishing among speech events, non-transient background noise, and transient noise events.

16. The headset of claim 6, wherein:

the headset wirelessly transmits the signals indicative of at least the classifications of the frames of audio to a speech recognition system separate from the headset that implements a speech recognizer; and the speech recognizer is configured for adjusting a confidence value of a hypothesis or portion thereof based at least in part on distinguishing among speech events, non-transient background noise and transient noise events.

17. A method of operating a system comprising (i) a headset comprising a microphone, memory, and a processor for executing instructions stored in the memory, the instructions comprising a sound classifier and (ii) a speech recognition device comprising memory and a processor for executing instructions stored in the memory, the instructions comprising a speech recognizer, the method comprising:

analyzing, with the headset processor, each of a plurality of frames of audio from the microphone;

classifying, with the headset processor, a first number of the frames of audio as speech;

classifying, with the headset processor, a second number of the frames of audio as non-transient background noise;

classifying, with the headset processor, a third number of the frames of audio as transient noise events;

generating, with the headset processor, signals indicative of at least the classifications of the frames of audio;

receiving, with the speech recognition device processor, the generated signals indicative of at least the classifications of the frames of audio;

analyzing, with the speech recognition device processor, the audio from the microphone using the classifications of the frames of audio, stored models, and stored grammars;

updating, with the speech recognition device processor, a stored model of the non-transient background noise based on the classifications of the frames of audio; and transmitting, with the speech recognition device processor, recognized text and/or metadata.

18. The method of claim 17, comprising providing the plurality of frames with at least two microphones.

19. The method of claim 17, wherein the headset comprises a second microphone and the method comprises analyzing, with the headset processor, each of a plurality of frames of audio from the second microphone.

20. The method of claim 17, wherein classifying a second number of the frames of audio as non-transient background noise by the sound classifier comprises, for each frame of audio:

determining a metric for the respective frame;

comparing the determined metric for the respective frame to an average metric for a plurality of frames of audio; and classifying the respective frame as a transient noise if the determined metric for the respective frame exceeds the average metric for the plurality of frames of audio by at least a first threshold, and otherwise classifying the respective frame as a non-transient background noise.

* * * * *